(12) United States Patent
Aizawa et al.

(10) Patent No.: US 7,007,850 B2
(45) Date of Patent: Mar. 7, 2006

(54) BAR CODE READING APPARATUS, MOVING MIRROR FOR BAR CODE READING APPARATUS, AND MANUFACTURING THEREOF

(75) Inventors: Hidekuni Aizawa, Kanagawa (JP); Keigo Suzuki, Fukushima (JP); Tamiaki Matsuura, Kanagawa (JP)

(73) Assignee: Sony Corporation, (JP)

( * ) Notice: Subject to any disclaimer, the term of this patent is extended or adjusted under 35 U.S.C. 154(b) by 441 days.

(21) Appl. No.: 10/275,405

(22) PCT Filed: Mar. 26, 2002

(86) PCT No.: PCT/JP02/02926

§ 371 (c)(1),
(2), (4) Date: Jan. 9, 2003

(87) PCT Pub. No.: WO02/077906

PCT Pub. Date: Oct. 3, 2002

(65) Prior Publication Data

US 2005/0161509 A1    Jul. 28, 2005

(30) Foreign Application Priority Data

Mar. 26, 2001 (JP) ............................... 2001-87618
Jul. 9, 2001 (JP) ............................ 2001-207296
Jan. 23, 2002 (JP) ............................... 2002-14258

(51) Int. Cl.
  *G02B 26/00* (2006.01)
(52) U.S. Cl. .............................. 235/462.36; 235/462.38
(58) Field of Classification Search ........... 235/462.37, 235/462.33, 462.36, 472.01, 462.01, 462.43
See application file for complete search history.

(56) References Cited

U.S. PATENT DOCUMENTS

| 4,978,207 | A | * | 12/1990 | Gillner et al. | ............... 359/871 |
| 5,280,163 | A | * | 1/1994 | Barkan | ................... 235/462.36 |
| 5,484,995 | A | * | 1/1996 | Scofield et al. | ......... 235/462.37 |
| 5,539,192 | A | * | 7/1996 | Scofield et al. | ......... 235/462.37 |
| 5,614,706 | A | * | 3/1997 | Bard et al. | ............. 235/462.36 |
| 6,142,379 | A | * | 11/2000 | Bard et al. | ............. 235/472.01 |

FOREIGN PATENT DOCUMENTS

| JP | 4-49535 | 2/1992 |
| JP | 7-261109 | 10/1995 |
| JP | 11-25243 | 1/1999 |

* cited by examiner

*Primary Examiner*—Daniel Stcyr
*Assistant Examiner*—Daniel A. Hess
(74) *Attorney, Agent, or Firm*—Rader, Fishman & Grauer PLLC; Ronald P. Kananen

(57) ABSTRACT

A bar code reading apparatus comprises: a laser module (1) having a light-emitting device (13) and a light-receiving device (14) arranged in a substantially orthogonal state; a moving mirror having a mirror mounted on a stand, swing shafts provided on both sides of the stand, a magnet mounted on a lower side of the stand, a supporting pole arranged below the magnet, and an air-core driving coil in which the supporting pole is inserted; and a light-emitting lens for condensing a light beam from the light-emitting device (13) and reflecting the light beam to the mirror; the laser module, the moving mirror and the light-emitting lens being housed in a housing. Thus, miniaturization of the reading apparatus is realized, and the bar code reading apparatus is provided in which the light-receiving accuracy is improved while the swing of the mirror is secured.

10 Claims, 22 Drawing Sheets

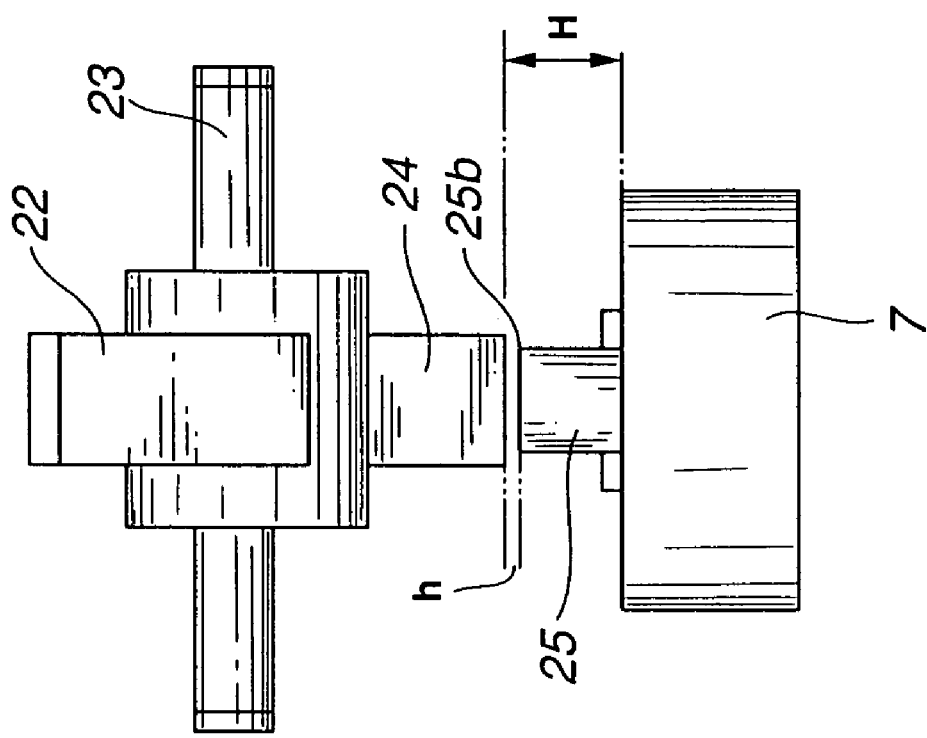
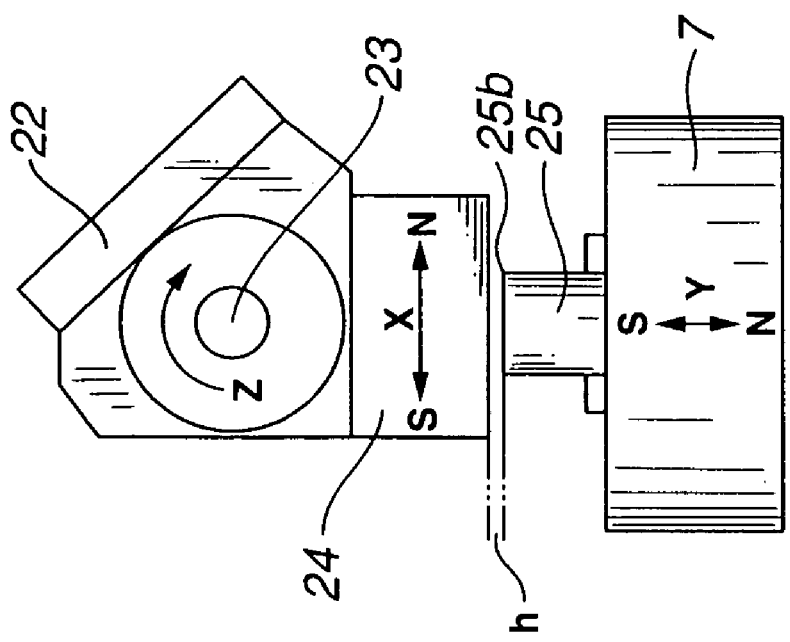
FIG.12B
FIG.12A

BAR CODE READING APPARATUS, MOVING MIRROR FOR BAR CODE READING APPARATUS, AND MANUFACTURING THEREOF

TECHNICAL FIELD

This invention relates to a bar code reading apparatus for scanning an irradiation object with a light beam emitted from a light-emitting device and causing a return light from the irradiation object to become incident on a light-receiving device so as to optically read a bar code, a moving mirror for bar code reading apparatus, and a manufacturing method therefor.

BACKGROUND ART

Conventionally, in most stores and plants, sales management of goods and production control of products are carried out by attaching bar codes representing digital information to articles and optically scanning the bar codes to read the information. Generally, for a bar code of this type, information is read from the combination of detected signals obtained by casting a light beam to the bar code and photoelectrically converting the intensity of its return light.

The reading system for information based on a bar code of this type will now be described with reference to the conceptual view of FIG. 21. A light beam from a light-emitting device 501 is narrowed by a light-emitting lens 503 and this light beam is reflected by a mirror 507 of a scanning mirror (moving mirror) 505 so as to be incident on a bar code 509. The mirror 507 swings to cast the light beam to the entire range of the bar code 509. The mirror 507 is caused to swing about a swing center shaft 515 as supporting shaft, by inserting a magnet 511 attached to the mirror 507 into a driving coil 513 and then causing a positive/negative current to flow through the driving coil 513, for example, in a predetermined cycle.

The light cast on the surface of the bar code 509 is irregularly reflected but returns to the mirror 507 with changes in the quantity of light due to the black and white of the bar code. The light beam reflected by the mirror 507 is then condensed by a condensing mirror 517 and the changes in the quantity of light are electrically converted and thus outputted by a light-receiving device 519.

To improve the reading accuracy, a band-pass filter (BPF) 521 is provided on the front side of the light-receiving device 519 to prevent intake of unwanted light beams having a frequency other than the emission frequency.

Such a reading system is implemented by a bar code reading apparatus shown in FIG. 22. This bar code reading apparatus has a light-emitting mechanism A constituted by the light-emitting device 501 and the light-emitting lens 503 which are housed in a housing 525, and a light-receiving mechanism B constituted by the light-receiving device 519, the light-receiving lens 517 and the BPF 521 which are housed in a housing 527, with the light-emitting mechanism A and the light-receiving mechanism B mounted on a board 529, as shown in FIG. 22.

The electric connection within the respective housings 525, 527 is made by wire bonding or the like. The mirror 507 of the moving mirror 505 is arranged so that it can swing about the swing center shaft 515. These light-emitting mechanism A, light-receiving mechanism B and the moving mirror 505 are arranged within a frame, not shown, to constitute the bar code reading apparatus.

In the bar code reading apparatus constituted as described above, the light-emitting mechanism A and the light-receiving mechanism B are housed in separate casings. That is, the bar code reading apparatus has a double-armor structure. Therefore, miniaturization of the bar code reading apparatus is limited and may cause deterioration in the light-receiving accuracy and uncertainty of the swing of the mirror.

Particularly, in a handy-type bar code reading apparatus, since no magnetic force is applied to the moving mirror when the power is off, there arises a problem that the moving mirror can freely swing and its inertial force may cause the mirror to be abutted against the peripheral members. Generally, the mirror of the moving mirror is formed in a rectangular shape by using a glass material, and the edge surface of the mirror made of the glass material is fragile. Therefore, when a particularly strong shock is applied, for example, when the bar code reading apparatus is dropped by accident, the sharp and fragile edge part and four corners might be damaged in contact with the peripheral members.

As a solution to such a problem, the moving mirror for the conventional bar code reading apparatus is constituted by bonding a dedicated buffer member such as a cushion sheet 533 to a protective stopper member 531 shown in FIG. 22, thus preventing the damage of the mirror 507 due to the contact with the peripheral members. However, as the separate buffer member is bonded, the reduction in size and weight is obstructed and the manufacturing cost is increased. Moreover, the work performance is not very good because the buffer member must be bonded to the very small protective stopper member.

In the conventional bar code reading apparatus, the resonance frequency of the swing mechanism (including the mirror 507) which swings about the swing center shaft 515 is decided by adding an elastic member such as a leaf spring or silicone to the part of the mirror 507 of the moving mirror 505 which in contact with the swing center shaft 515.

In manufacturing the bar code reading apparatus, there may be some difference in the dimension and weight of the components, which causes difference in the resonance frequency of the swing mechanism on completion of the assembly of the apparatus. Therefore, a desired resonance frequency may not be provided. Moreover, there is also a problem that the static posture of the mirror 507 when the driving coil 513 is not electrified (neutral point of the mirror when swinging) might differ because of the difference in the relative position between the mirror 507 and the swing center shaft 515 and the mounting position of the magnet 511.

DISCLOSURE OF THE INVENION

In view of the foregoing status of the art, it is a first object of the present invention to provide a bar code reading apparatus which satisfactorily meets the demand for miniaturization and secures improvement in the light-receiving accuracy and the swing of its mirror.

It is a second object of the present invention to provide a moving mirror for bar code reading apparatus which enables prevention of damage of its mirror due to contact with other components without using a dedicated buffer member, and a manufacturing method therefor, thus realizing improved shock resistance, further reduction in weight and reduction in manufacturing cost while achieving miniaturization.

It is a third object of the present invention to provide a bar code reading apparatus capable of setting the resonance frequency of its swing mechanism and the static posture of its mirror under optimum conditions, despite unevenness in manufacture, that is, difference in the dimension, weight and mounting position of components.

In order to achieve the above-described objects, a bar code reading apparatus according to the present invention comprises: a laser module having a light-emitting device and a light-receiving device arranged in a substantially orthogonal state; a moving mirror having a mirror mounted on a stand, swing shafts provided on both sides of the stand, a magnet mounted on a lower side of the stand, a supporting pole arranged below the magnet, and an air-core driving coil in which the supporting pole is inserted; and a light-emitting lens for condensing a light beam from the light-emitting device and reflecting the light beam to the mirror; the laser module, the moving mirror and the light-emitting lens being housed in a housing.

In the laser module constituting the bar code reading apparatus according to the present invention, the light-emitting device and the light-receiving device are mounted on a lateral surface and a top surface of a prism, respectively, so that the light-emitting device and the light-receiving device are arranged in a substantially orthogonal state, and the light-receiving device has a broader area than the top surface of the prism and protrudes toward the light-emitting device.

In the moving mirror constituting the bar code reading apparatus according to the present invention, a top part of the supporting pole is arranged to have a magnetic space to the magnet and its leg part is inserted in the air core of the driving coil. In this moving mirror for bar code reading apparatus, the mirror connected to a magnetic material is caused to swing using a magnetic force generated by applying a current to the driving coil, a light beam emitted from the light-emitting device is deflected by the mirror to scan an irradiation object, and a return light beam from the irradiation object is reflected to be incident on the light-receiving device. At least at four corners on a rectangular back side which is opposite to a reflection surface of the mirror, an adhesive having predetermined elasticity after hardening is applied to cover the corner parts.

In the moving mirror for bar code reading apparatus used here, as the adhesive is applied to the four corners on the back side of the mirror to cover the corner parts, damage of the mirror due to contact with other components can be prevented without using any dedicated buffer member such as a cushion sheet, and the shock resistance can be improved while miniaturization can be realized. Moreover, since the adhesive is locally applied for protection, the quantity of the adhesive as the buffer member may be the minimum necessary quantity and the weight of the bar code reading apparatus can be reduced as a whole. Furthermore, since no dedicated buffer member is required and the conventionally used adhesive is used, the manufacturing costs can be reduced.

In the moving mirror for bar code reading apparatus used for the bar code reading apparatus according to the present invention, the adhesive is applied to cover a pair of edge parts parallel to a swing center shaft on the back side of the mirror. In this moving mirror for bar code reading apparatus, the pair of edge parts parallel to the swing center shaft on the back side of the mirror, that is, the edge parts on both ends of swing, as well as the corner parts at the four corners on the back side of the mirror, are covered with the adhesive. Thus, the edge parts, which are fragile and have a large quantity of displacement due to swing, can be protected and the shock resistance can be improved.

Morever, in the moving mirror for bar code reading apparatus used for the bar code reading apparatus according to the present invention, the adhesive may be applied to cover a pair of edge parts orthogonal to a swing center shaft on the back side of the mirror. In this moving mirror for bar code reading apparatus, the pair of edge parts orthogonal to the swing center shaft on the back side of the mirror, that is, edge parts equivalent to arm parts between both ends of swing and the swing center shaft, as well as the corner parts at the four corners on the back side of the mirror, are covered with the adhesive. Thus, damage of the edge parts due to contact with peripheral members can be prevented and the mirror strength is increased, thus improving the shock resistance.

Furthermore, in the moving mirror for bar code reading apparatus used in the bar code reading apparatus according to the present invention, the adhesive may be applied to cover edge parts on the entire circumferential edge on the back side. In this moving mirror for bar code reading apparatus, the edge parts on the entire circumferential edge on the back side of the mirror as well as the corner parts at the four corners on the back side of the mirror are covered with the adhesive. That is, the edge parts on the entire back side are covered and damage of the edge parts due to contact with peripheral members can be prevented. The adhesive is integrated in a frame-like shape and the mirror strength is increased, thus improving the shock resistance.

Moreover, in the moving mirror for a bar code reading apparatus used in the bar code reading apparatus according to the present invention, the adhesive may be applied to the entire back side of the mirror. In this moving mirror for bar code reading apparatus, the entire the back side of the mirror as well as the corner parts at the four corners on the back side of the mirror are covered with the adhesive. Therefore, damage due to contact with peripheral members can be prevented on the entire back side of the mirror. The adhesive is integrated in a planar shape and the mirror strength is increased, thus improving the shock resistance. Moreover, since the entire surface is covered with the adhesive, the mirror can be protected from damage due to collision with peripheral members broken and scattered by a shock. As the entire surface is coated with the adhesive, the swing member and the magnetic material can be adhered by using the adhesive, and the application of the adhesive for mirror protection and the application of the adhesive for fixing the swing member and the like can be completed at a time.

In the moving mirror for a bar code reading apparatus used in the bar code reading apparatus according to the present invention, a protective stopper member is provided near the mirror to which the adhesive is applied, and the mirror is abutted against the protective stopper member with the adhesive provided between them, thus regulating excessive swing of the mirror due to a shock. In this moving mirror for the bar code reading apparatus, the mirror is abutted against the protective stopper member through the adhesive applied to the corner parts at the four corners on the back side of the mirror, and for example, the shock in the case where the bar code reading apparatus is dropped can be absorbed by the adhesive. Thus, unlike the conventional structure, a dedicated buffer member such as a cushion sheet need not be bonded to the protective stopper member and the protective stopper member can be made compact as a whole.

According to the present invention, there is also provided a method for manufacturing a moving mirror for bar code reading apparatus in which a mirror connected with a magnetic material is caused to swing by using a magnetic force generated by applying a current to a driving coil, a light beam emitted from a light-emitting device is deflected by the mirror to scan an irradiation object, and a return light beam from the irradiation object is reflected to be incident on a light-receiving device. The method comprises an adhesive application step of applying an adhesive to at least a back side of the mirror or a swing member in order to fix the swing member to the back side of the mirror. At the adhesive application step, the same adhesive is applied to corner parts at four corners on the back side of the mirror.

In this method for manufacturing a moving mirror for a bar code reading apparatus, since the same adhesive is applied to the corner parts at the four corners on the back side of the mirror at the adhesive application step to fix the swing member to the mirror, the application of the adhesive can be carried out within the work range of the conventional adhesive application step. Thus, it is possible to manufacture a moving mirror for a bar code reading apparatus on which a protective adhesive is easily applied without adding a new step and without using any separate buffer member.

Another bar code reading apparatus according to the present invention comprises: a swing member holding a mirror and supported so that it can freely swing about a swing shaft; a first magnet mounted on the swing member and forming a magnetic field in a direction substantially orthogonal to the swing shaft; a swing driving unit for causing the swing member to swing by magnetic attraction or repulsion to the magnetic field formed by the first magnet; and a second magnet causing a force of magnetic attraction to act between different magnetic poles of the second magnet and the first magnet and provided to be displaceable in a first direction for varying the magnitude of the force of magnetic attraction and in a second direction for varying the balance of the force of magnetic attraction.

In this bar code reading apparatus, the second magnet may be displaced in the first direction to vary the magnitude of the force of magnetic attraction acting between the first magnet and the second magnet, thus changing the resonance frequency of the swing mechanism including the mirror and the swing member. The second magnet may be displaced in the second direction to vary the balance of the force of magnetic attraction acting between the first magnet and the second magnet, thus changing the static posture of the mirror when the swing driving unit is in a non-driving state.

The second magnet constituting the bar code reading apparatus according to the present invention may be arranged to face the first magnet with the swing driving unit provided between them, and may be provided to be displaceable in a direction toward/away from the first magnet and in a direction of a central axis of a magnetic field of the first magnet.

Moreover, the second magnet may be arranged to face the first magnet with the swing driving unit provided between them, and may be provided to be displaceable in a direction toward/away from the first magnet and in a rotational direction about a boundary part of magnetization polarity of the second magnet.

The other objects of the present invention and specific advantages provided by the present invention will be clarified further from the following description of embodiments with reference to the drawings.

BRIEF DESCRIPTION OF THE DRAWINGS

FIGS. 12A and 12B are views for explaining the swing state of the moving mirror.

BEST MODE FOR CARRYING OUT THE INVENTION

Preferred embodiments of the bar code reading apparatus, the moving mirror for a bar code reading apparatus and the manufacturing method therefor according to the present invention will now be described in detail with reference to the drawings.

A bar code reading apparatus according to a first embodiment of the present invention has constituent members including a laser module made up of a light-emitting device and a light-receiving device, and a moving mirror, which are housed in a housing.

These constituent members will be sequentially described.

Figure 1:
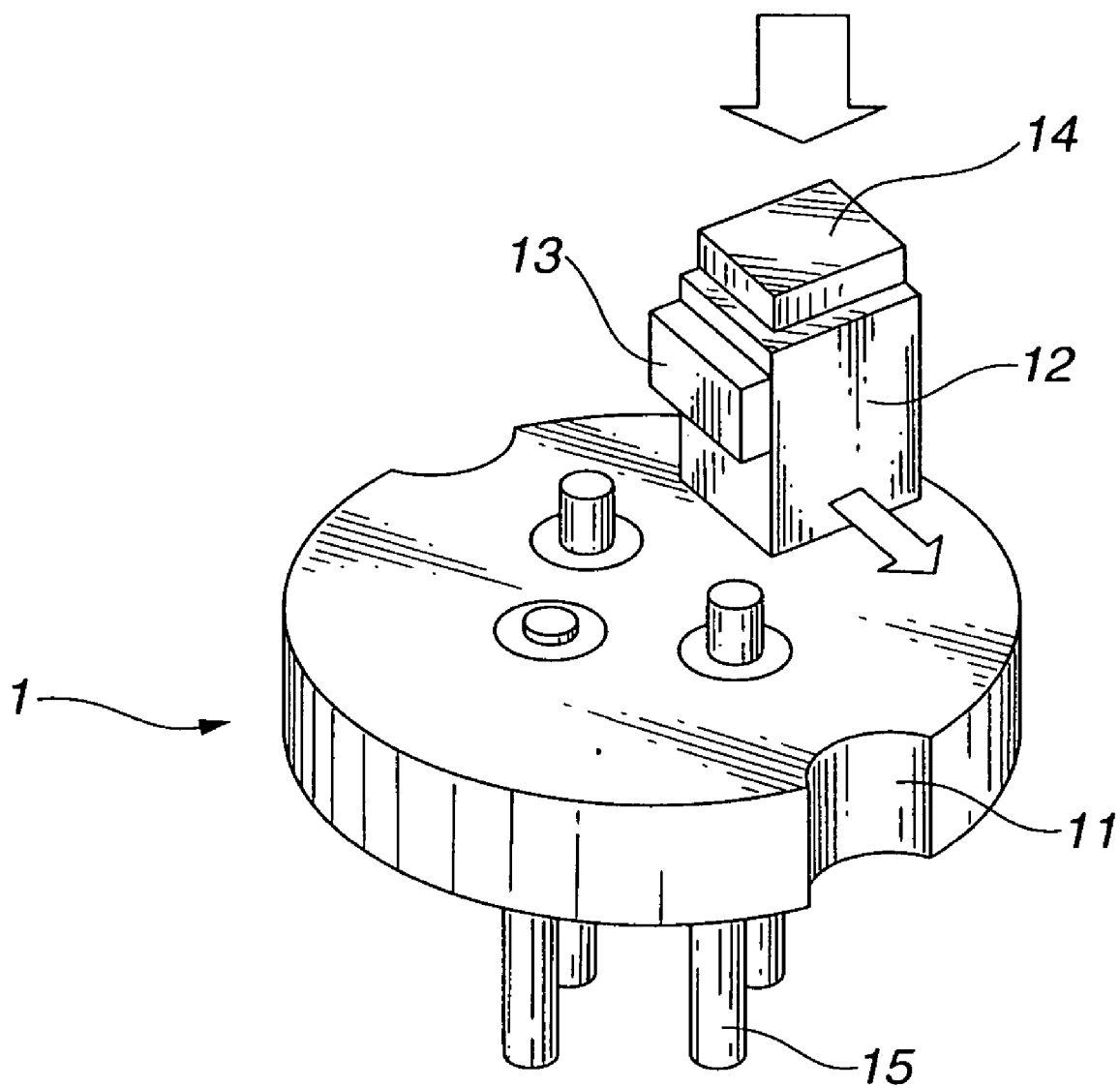
FIG. 1 is a perspective view showing a laser module used in a first embodiment of the present invention.

FIG. 1 is a perspective view of a laser module 1. In this laser module 1, a light-emitting device 13 and a light-receiving device 14 are mounted by using a prism 12 on a heat sink 11. For example, the light-emitting device 13 is mounted on one lateral side of the prism 12 and the light-receiving device 14 is mounted on the top side of the prism 12 so that the optical paths of the two devices are substantially orthogonal to each other. A lead pin 15 is provided upright on the heat sink 11 and this lead pin 15 is connected with each device by wire bonding or the like.

Figure 2:
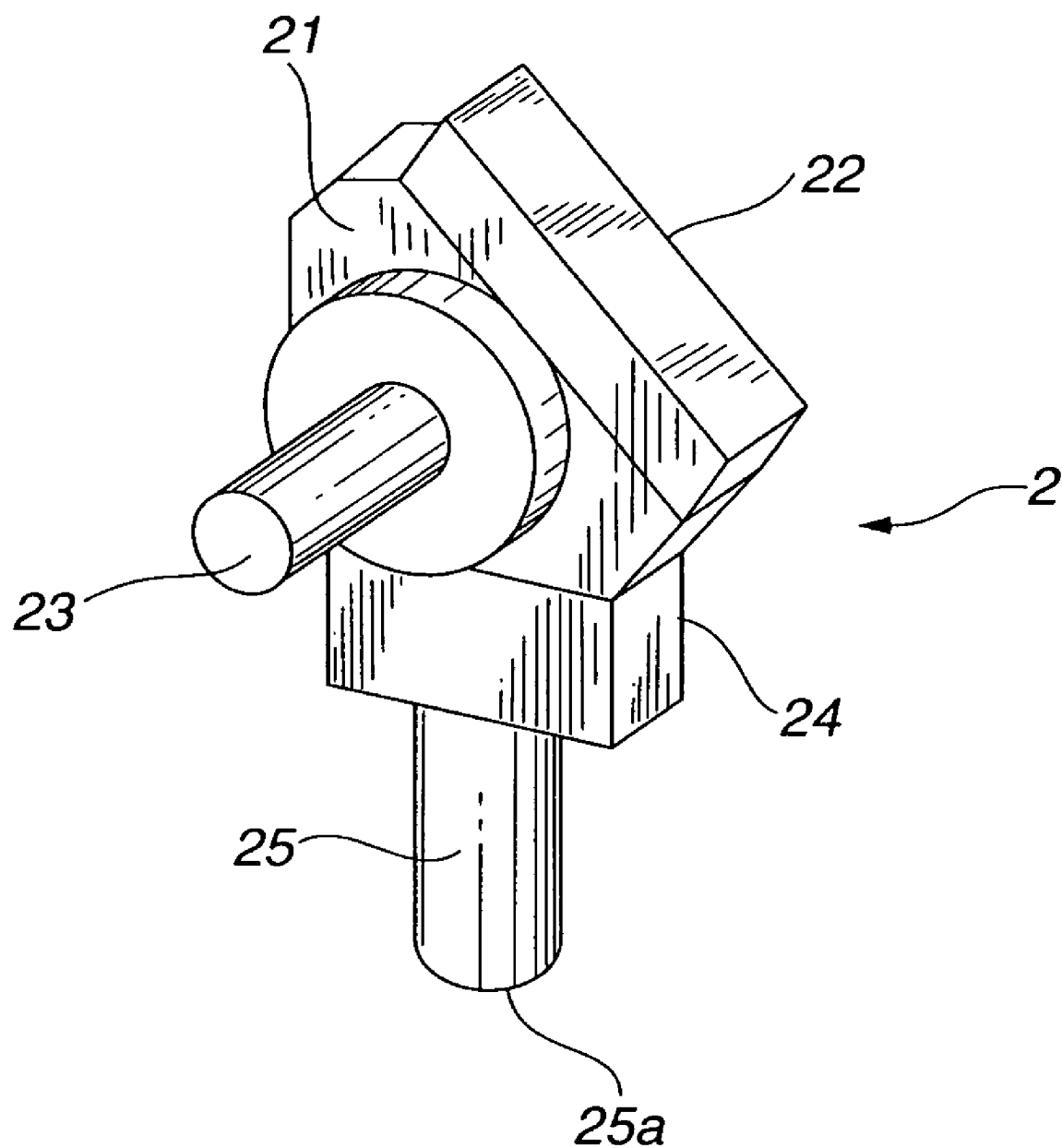
FIG. 2 is a perspective view showing a moving mirror.

FIG. 2 is a perspective view of a moving mirror 2. In this moving mirror 2, a mirror 22 is mounted on a stand 21 and swing shafts 23, 23 are provided on both sides of the stand 21. A magnet 24 is fixed on the lower side of the stand 21. Below the magnet 24, a supporting pole 25 made of a magnetic material is arranged orthogonally to the swing shafts 23 and with the top part of the supporting pole 25 forming a magnetic space to the magnet 24.

Figure 3:
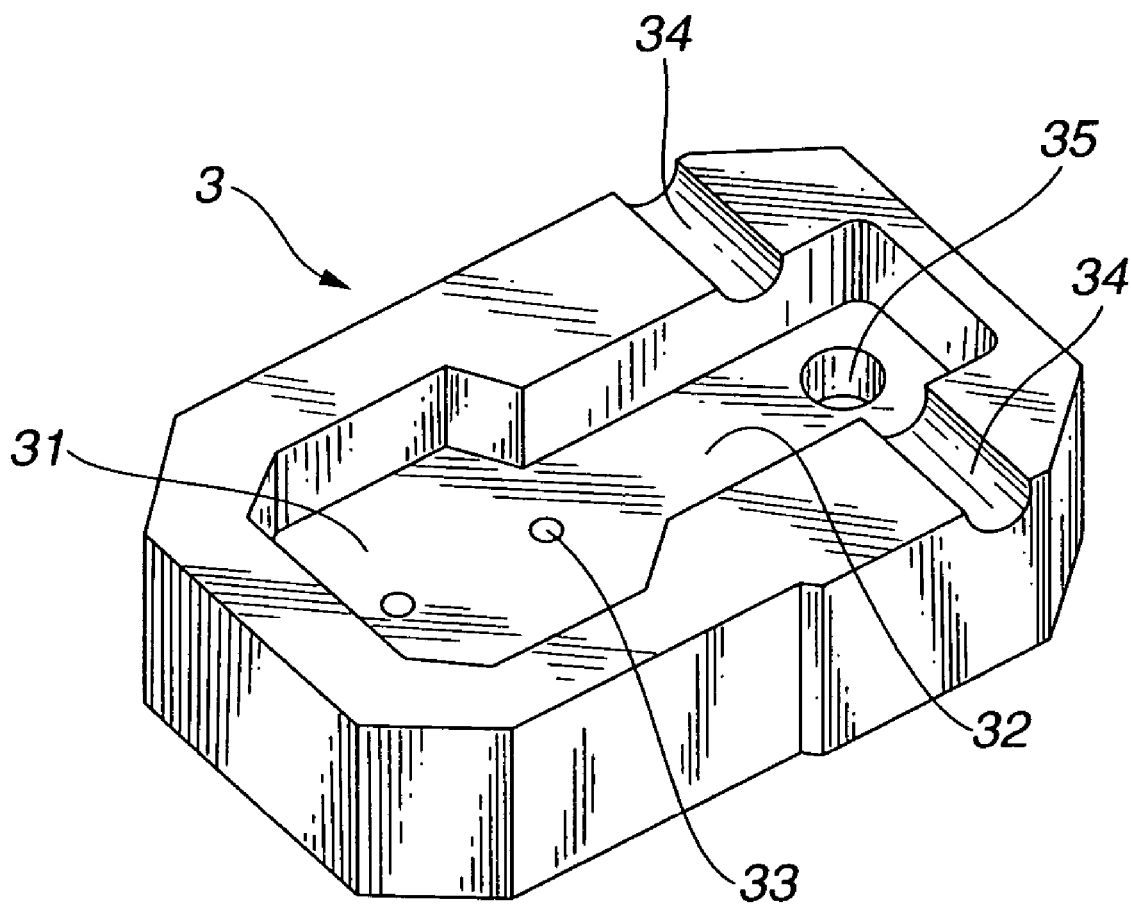
FIG. 3 is a perspective view showing a base of a housing.

FIG. 3 is a perspective view showing a base 3 of a housing, made up of an armor for the laser module 1 and the moving mirror 2. This housing base 3 is formed, for example, by integrally molding a resin material, and has a laser module housing unit 31 and a moving mirror housing unit 32 formed therein. On the bottom side of the laser module housing unit 31, a pin hole 33 is opened for inserting the lead pin 15 of the laser module 1.

Semicircular bearings 34, 34 are provided on both lateral edges of the moving mirror housing unit 32, and a hole 35 for inserting the supporting pole 25 of the moving mirror 2 is provided on the bottom side of the moving mirror housing unit 32.

Figure 4:
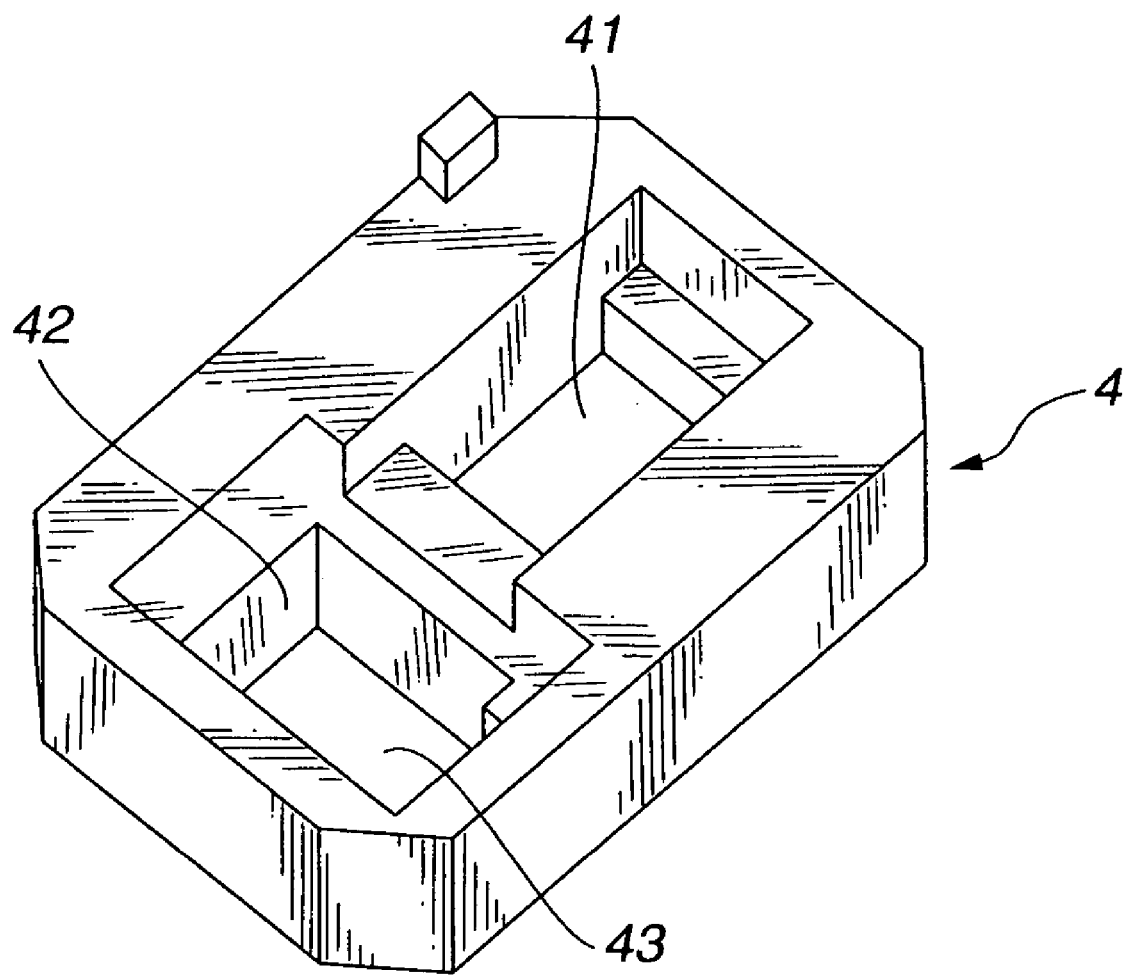
FIG. 4 is a perspective view showing a front part of the housing.

FIG. 4 is a perspective view showing a front part 4 of the housing applied to cover the housing base 3 from above. Similarly to the housing base 3, this front part 4 of the housing is integrally formed, for example, by using a resin material. A laser module housing unit 41 and a moving mirror housing unit 42 are formed, corresponding to the housing base 3. A light-receiving lens 43 is fitted in the moving mirror housing unit 42.

The assembly of the bar code reading apparatus according to the present invention will now be described.

Figure 5:
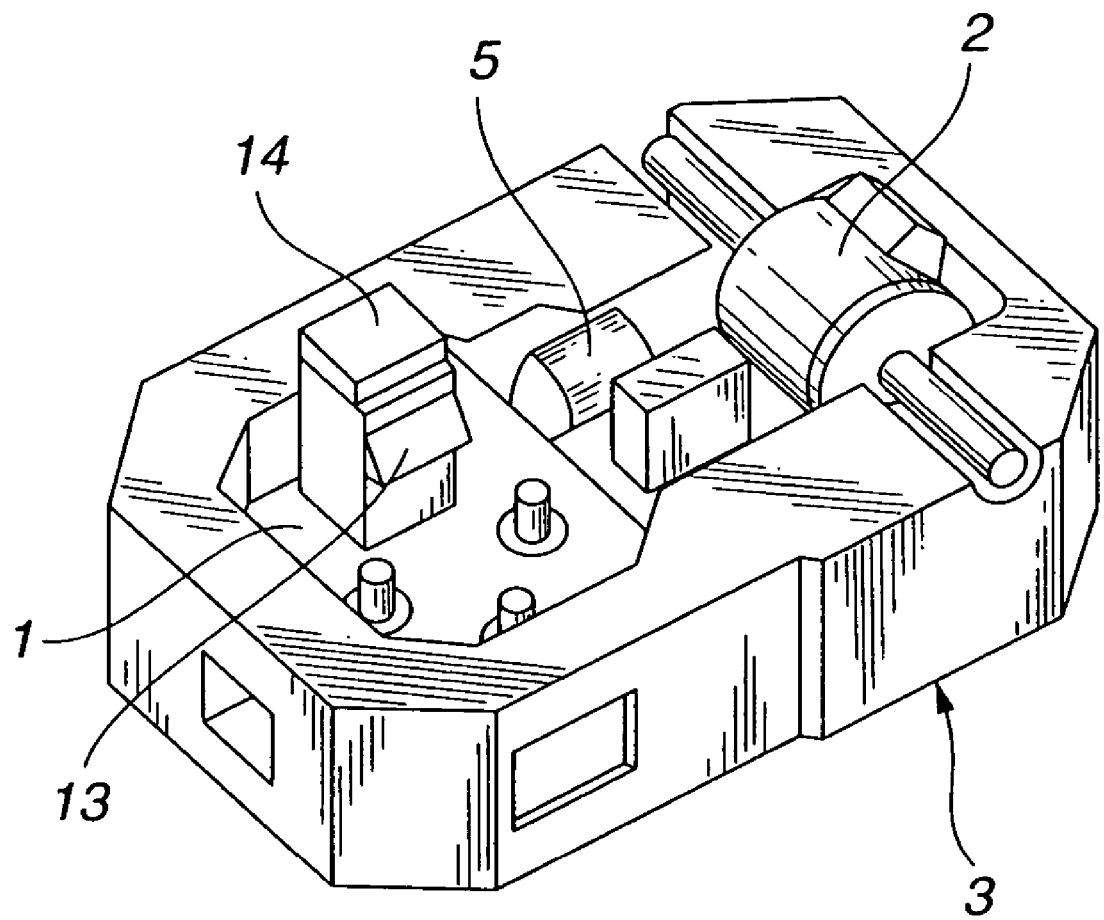
FIG. 5 is a perspective view showing the housing state within the housing.
Figure 6:
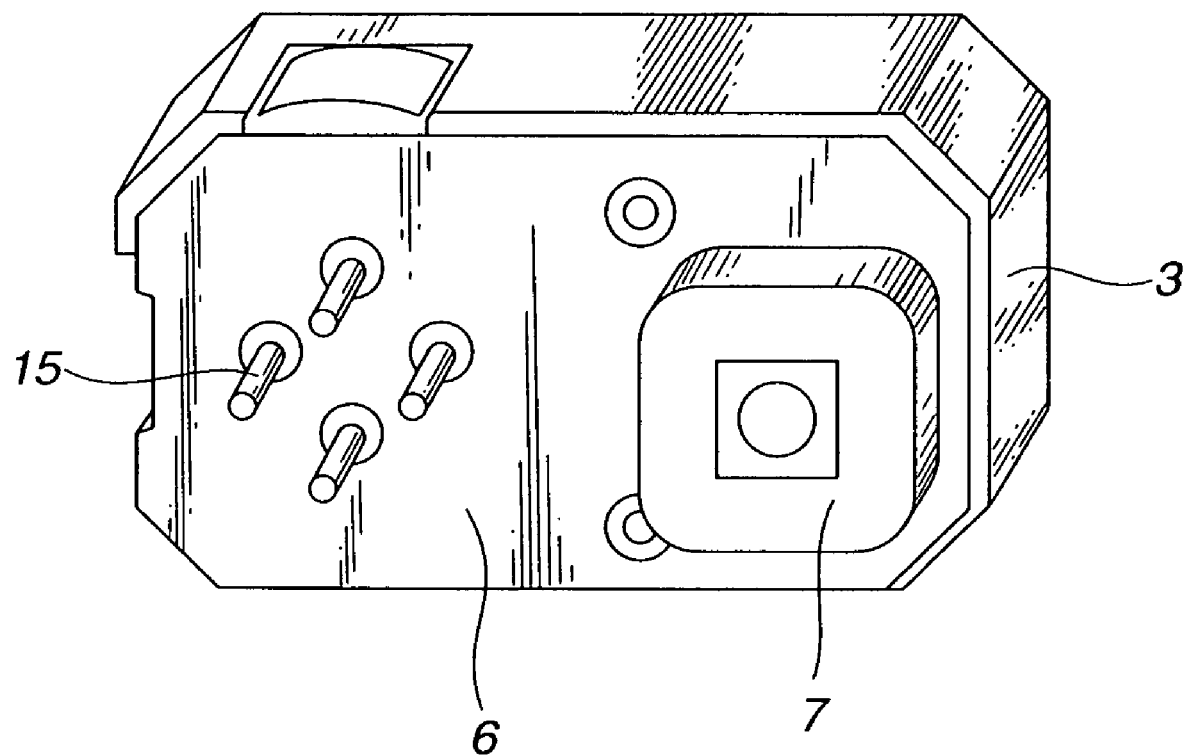
FIG. 6 is a perspective view showing the base of the housing, as viewed from its bottom side.

First, as shown in FIG. 6, a board 6 having an air-core driving coil 7 mounted thereon is fixed to the lower surface of the housing base 3 shown in FIG. 3. Then, the laser module 1 shown in FIG. 1 is arranged in the laser module housing unit 31, with the lead pin 15 of the laser module 1 fitted in the pin hole 33 and connected with the board 6. As shown in FIG. 5, a leg part 25a (see FIG. 2) of the supporting pole 25 is fitted in the hole 35 so as to be arranged in the air core of the driving coil 27. Then, the moving mirror 2 is dropped in the moving mirror housing unit 32 and the swing shafts 23, 23 are arranged in the bearings 34, 34. A light-emitting lens 5 is arranged between the laser module 1 and the moving mirror 2 and its focus is adjusted. Moreover, by applying a current to the driving coil 7 to adjust the magnetic space formed by the magnet 24 and the top part 25b (see FIG. 12) of the supporting pole 25, a predetermined resonance frequency is provided to the mirror.

After the above-described adjustment, the respective parts are fixed by using an adhesive or the like. The laser module housing unit 41 and the moving mirror housing unit 42 of the front part 4 of the housing are put correspondingly on the laser module 1 and the moving mirror 2 of the housing base 3, and these are fixed by an adhesive or the like.

Figure 7:
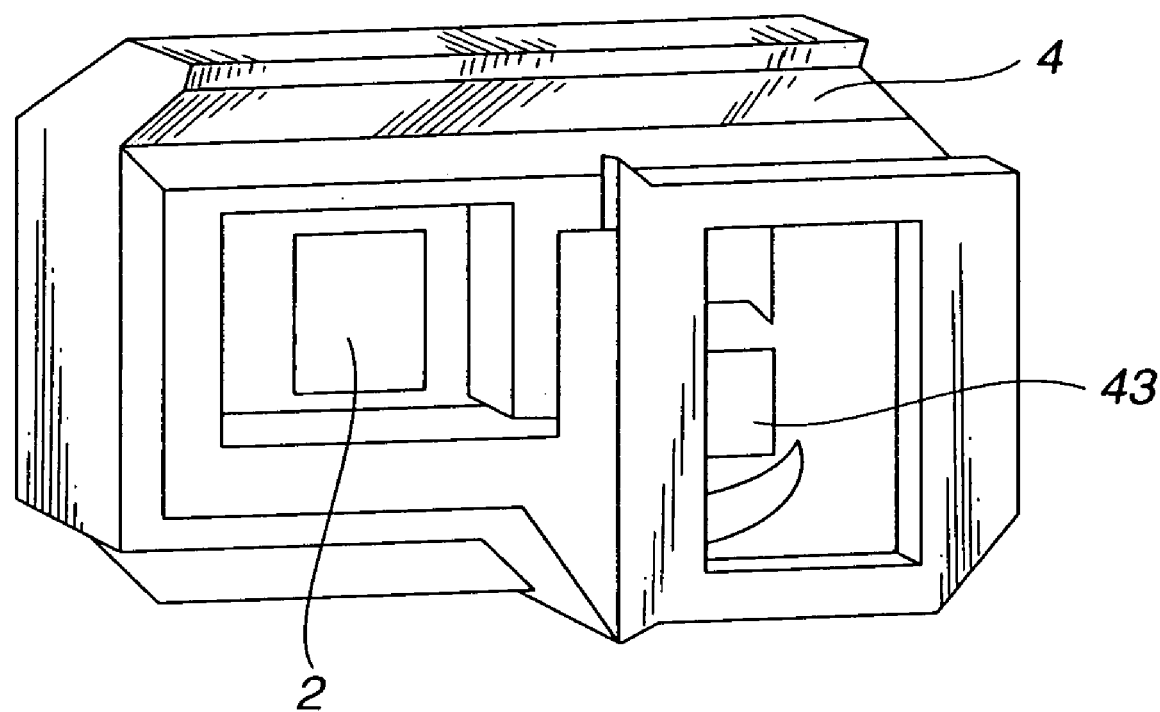
FIG. 7 is a perspective view showing the front part of the housing.
Figure 8:
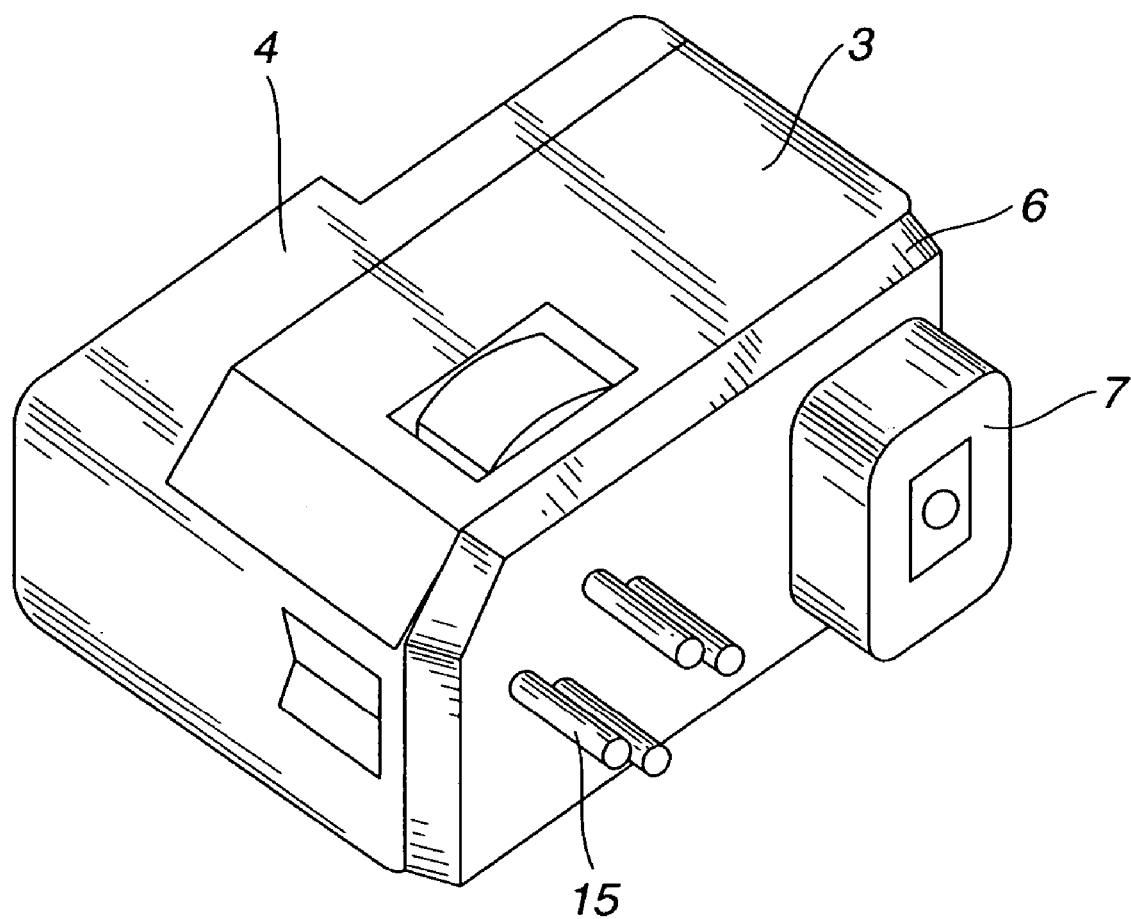
FIG. 8 is a perspective view showing a reading apparatus.

FIG. 7 shows the reading apparatus, as viewed from the side of the front part 4 of the housing. FIG. 8 is a perspective view of the reading apparatus, as viewed from the side of the bottom part (board 6).

In the bar code reading apparatus assembled as described above, the laser module and the moving mirror are not separated by individual casings but are housed in a pair of housings, thus constituting a small-sized reading apparatus as a whole. Moreover, since the laser module, the moving mirror and the light-emitting lens are housed at predetermined positions in the housing base, the assembly accuracy is secured and the assembly is facilitated.

Figure 9:
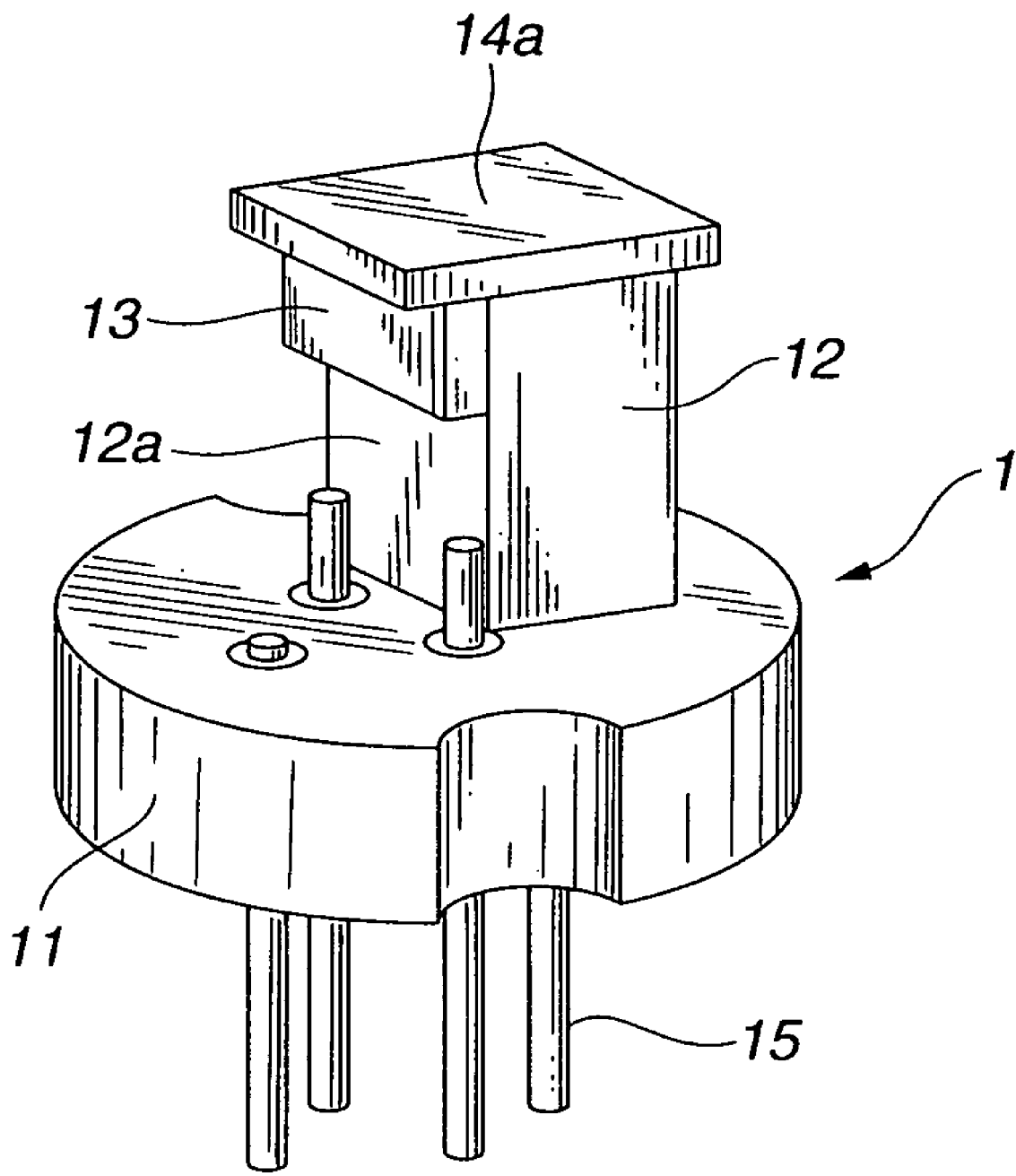
FIG. 9 is a perspective view showing another example of the laser module.
Figure 10:
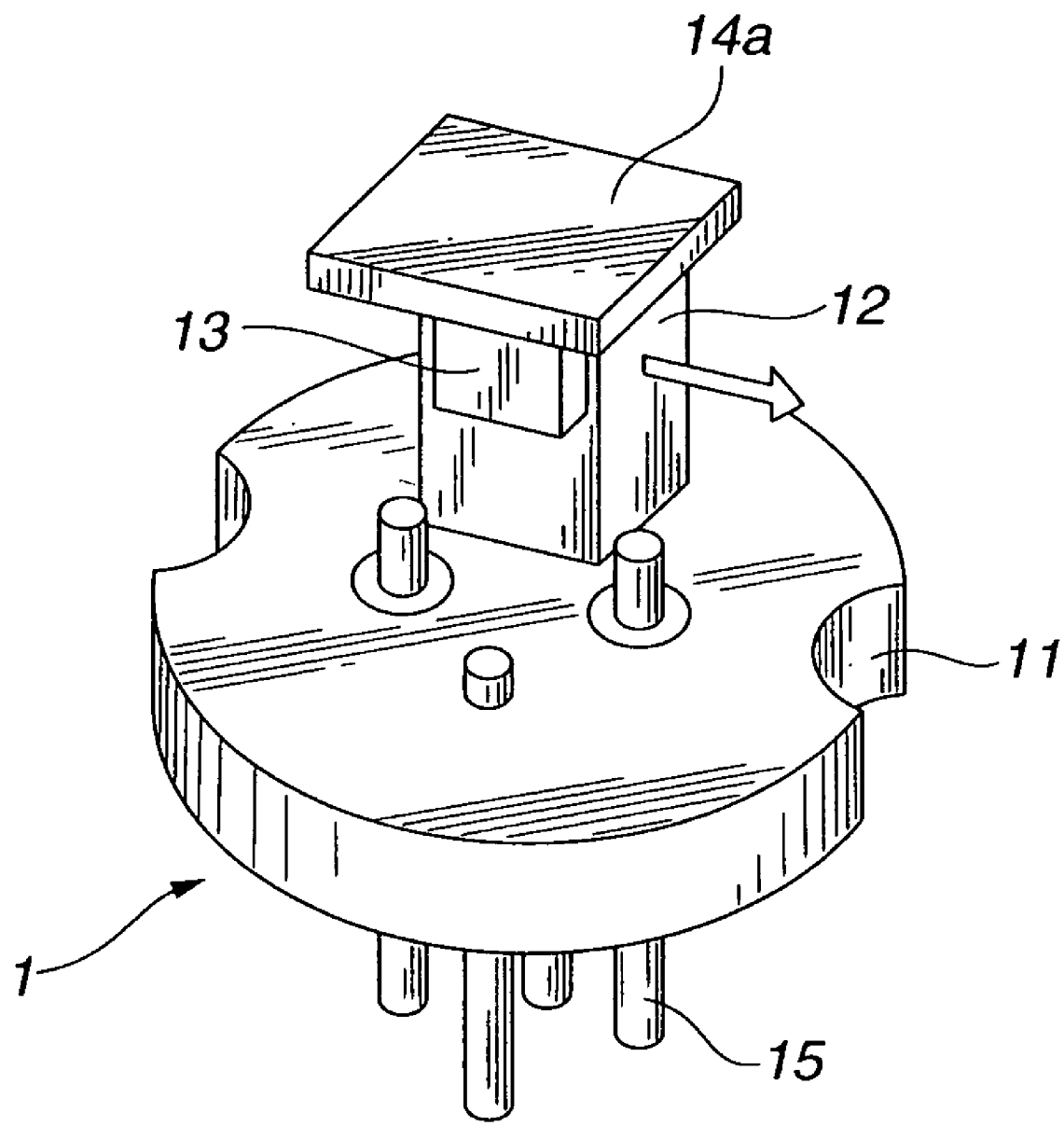
FIG. 10 is a perspective view showing the laser module, as viewed from a different direction.

FIGS. 9 and 10 are perspective views of the laser module 1 aimed at further improving the reading accuracy of the reading apparatus. In this laser module 1, the prism 12 is provided upright on the heat sink 11 and the light-receiving device 14a is mounted on one lateral side 12a of the prism 12.

That is, as the light-emitting device 13 and the light-receiving device 14a are orthogonally provided on the one prism 12, a margin is created for designing the arrangement of the lead pin 15 on the heat sink 11, thus enabling miniaturization of the laser module 1. However, the respective devices, particularly the light-receiving device is made smaller. Therefore, in the present invention, the light-receiving device 14a having a large area than the top side of the prism 12 is used to increase the quantity of received light and improve the light-receiving sensitivity.

As the light-receiving device 14a is projected to over the light-emitting device 13 as shown in FIGS. 9 and 10, the light-emitting device 13 is less susceptible to interference of light reception and stray light, thus improving the reading accuracy.

As the reading apparatus itself is miniaturized as described above, the adjustment of the mechanism at the time of assembly requires fine work, which affects the reading accuracy. Particularly, with respect to the swing of the moving mirror 2, though an elastic member such as a leaf spring or silicone is normally used for its swing support part, the resonance frequency of the mirror defined at the time of assembly might be varied on completion of assembly (shipment) because of the difference in the dimension and weight of the respective members.

Figure 11:
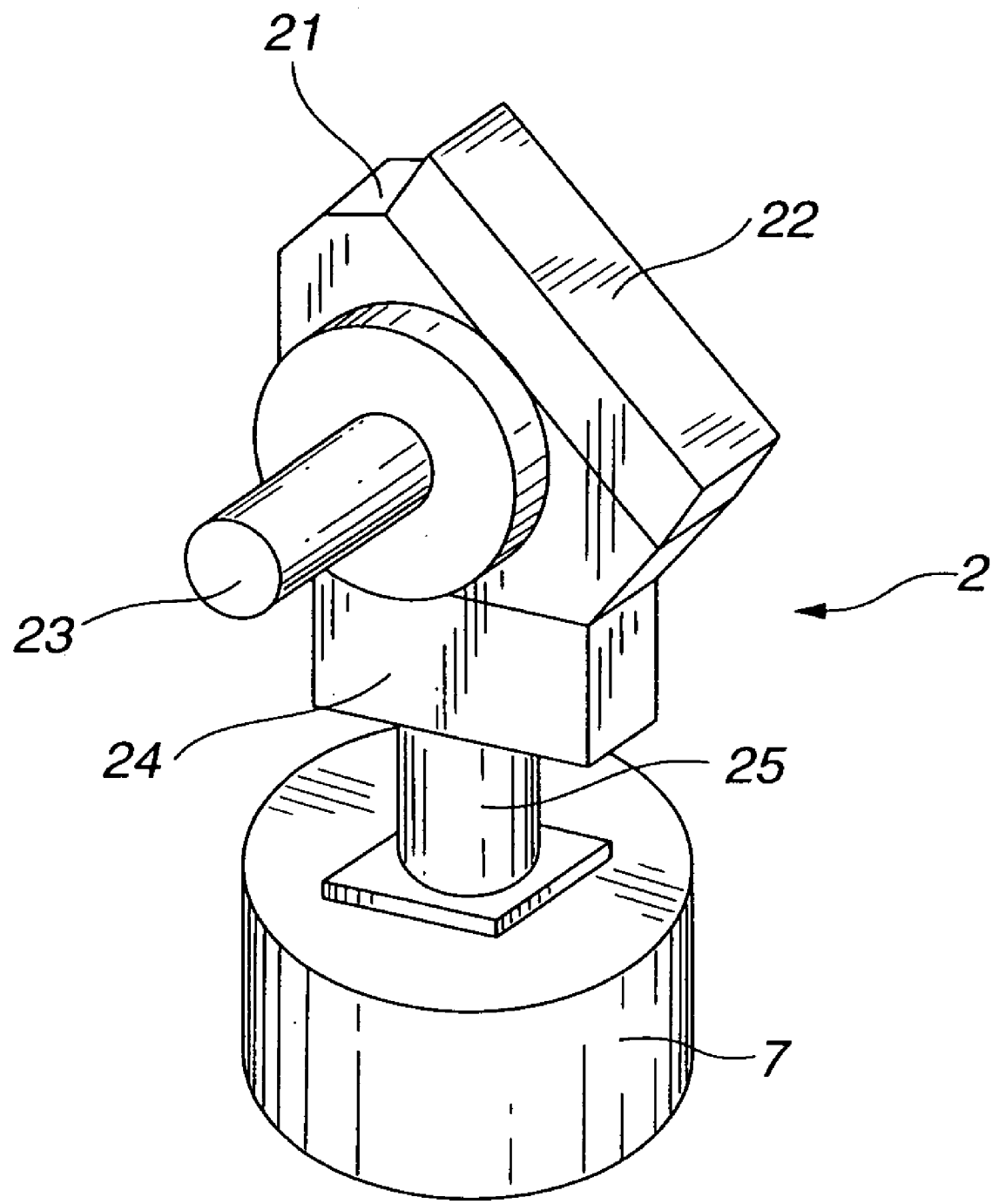
FIG. 11 is a perspective view showing another example of the moving mirror.

Thus, the reading apparatus of the present invention uses the moving mirror 2 shown in FIG. 11. In this moving mirror 2, as described above, the mirror 22 is mounted on the stand 21 and the swing shafts 23, 23 are provided on both lateral sides of the stand 21. The magnet 24 is fixed below the stand 21 and the supporting pole 25 made of a magnetic material such as ferrite or permalloy is arranged below the magnet 24. A magnetic space h (see FIG. 12) is provided between the top part 25b of the supporting pole 25 and the magnet 24, thus enabling the mirror 22 to swing. The leg part 25a (see FIG. 2) is inserted in the air-core driving coil 7 (see FIG. 6 or 8) mounted on the board.

The surface of the driving coil 7 and the lower surface of the magnet 24 have a spacing H between each other, as will be described later. Moreover, as shown in FIG. 12A, the center of the swing shaft 23 is situated substantially on an intermediate line between the south and north poles of the magnet 24. As a current is caused to flow through the driving coil 7 in such a state, a magnetic field Y passing through the center of the driving coil 7 is generated. On the other hand, a magnetic field X is generated in the magnet 24. A combined magnetic field of X and Y generates a moment Z centering on the swing shaft 23, and the mirror 22 (stand 21, magnet 24), which has the magnetic space h to the top part 25b of the supporting pole 25, swings at a predetermined resonance frequency.

Particularly when the center of the swing shaft 23 is largely deviated from the intermediate point between the south and north poles of the magnet 24, the mirror 22 swings broadly. The swing also changes in accordance with the frequency of the current flowing through the driving coil 7.

Since the supporting pole 25 made of a magnetic material is inserted in the air core of the driving coil 7, the resonance frequency of the swing changes in accordance with the depth of the insertion, that is, the size of the spacing H (see FIG. 12B) between the lower surface of the magnet 24 and the upper surface of the driving coil 7. Therefore, a desired resonance frequency can be obtained by changing the spacing H. After that, the supporting pole 25 may be fixed to the driving coil 7 by using an adhesive or the like. Thus, not only the resonance frequency can be adjusted on completion of assembly, but also another type of reading apparatus can be constituted by largely changing the spacing H and thus realizing another resonance frequency.

Hereinafter, a moving mirror for a bar code reading apparatus according to a second embodiment of the present invention, and a preferred embodiment of a manufacturing method therefor will be described in detail with reference to the drawings.

Figure 13:
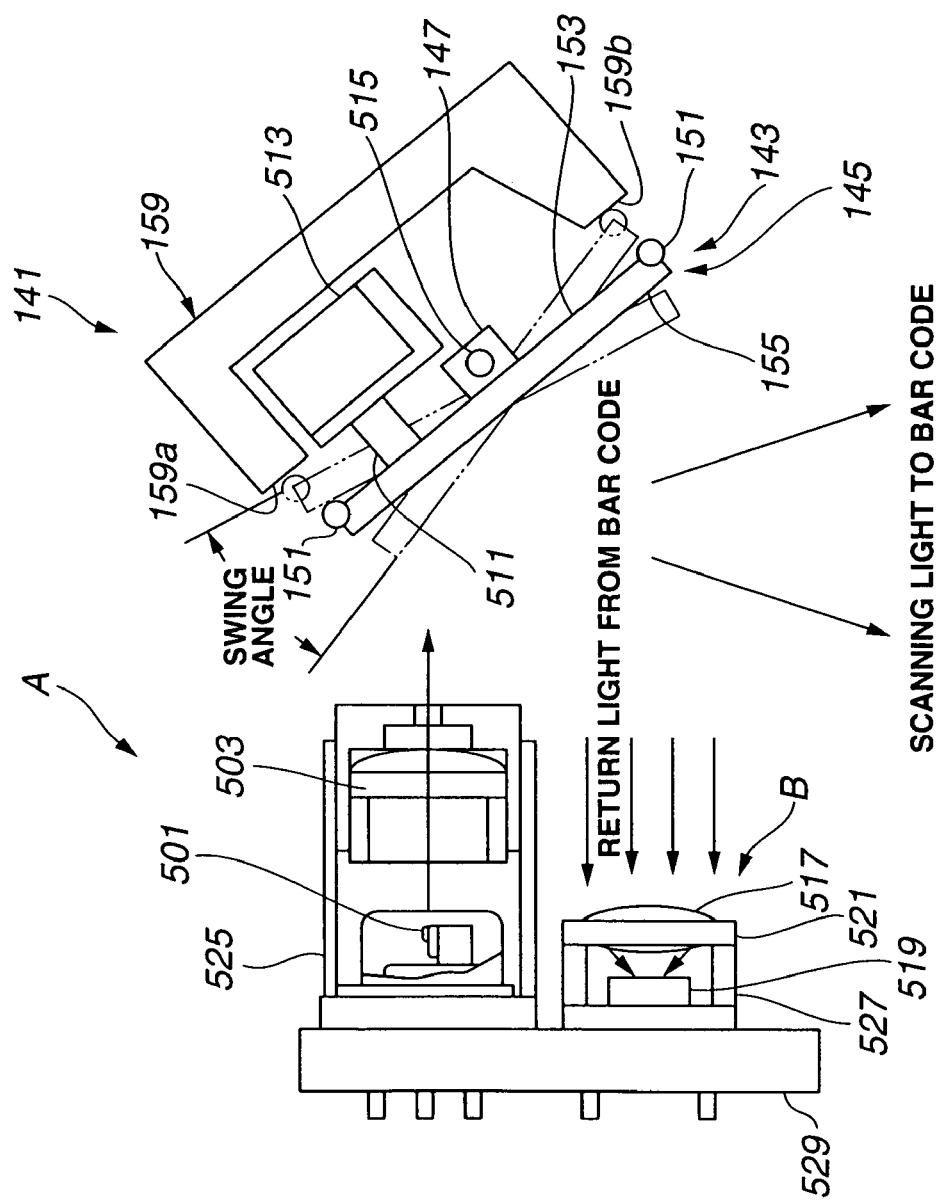
FIG. 13 is a structural view showing a bar code reading apparatus equipped with a moving mirror for bar code reading apparatus according to a second embodiment of the present invention.
Figure 14:
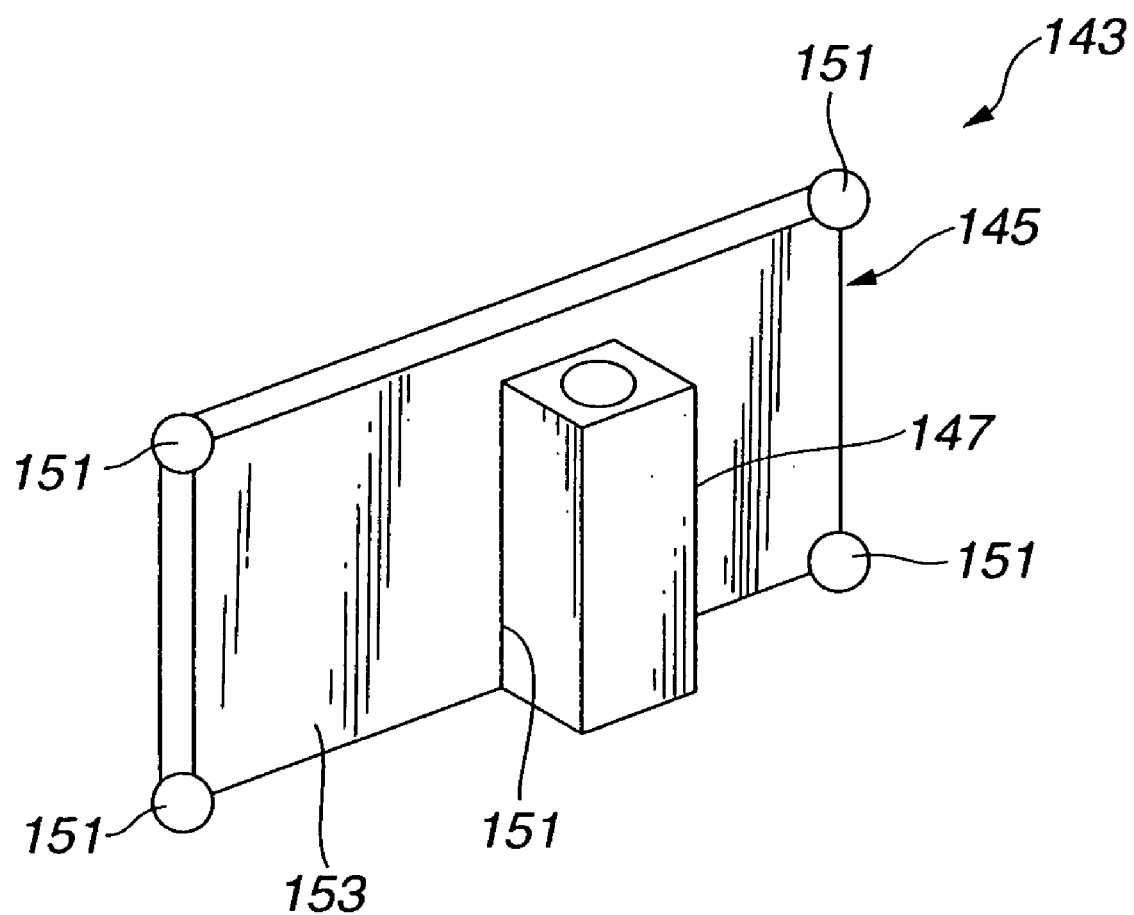
FIG. 14 is a perspective view showing a back side of the moving mirror for the bar code reading apparatus shown in FIG. 13.
Figure 15:
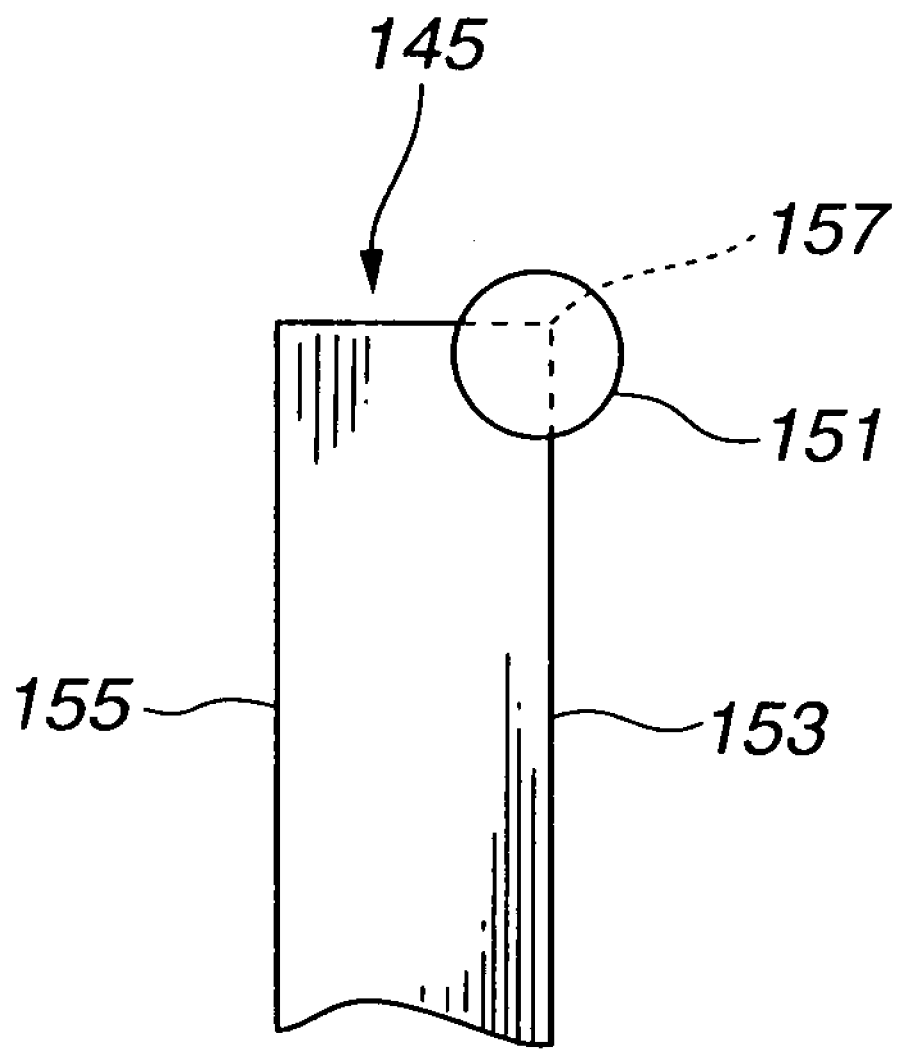
FIG. 15 is an enlarged side view showing essential parts of the moving mirror shown in FIG. 14.

FIG. 13 is a structural view showing a bar code reading apparatus equipped with a moving mirror for a bar code reading apparatus according to a second embodiment of the present invention. FIG. 14 is a back perspective view of the moving mirror for a bar code reading apparatus. FIG. 15 is an enlarged side view showing essential parts of FIG. 14.

A bar code reading apparatus 141 has a light-emitting mechanism A including a light-emitting device 501 and a light-emitting lens 503 housed in a housing 525, and a light-receiving mechanism B including a light-receiving device 519, a light-receiving lens 517 and a BPF 521 housed in a housing 527, with the light-emitting mechanism A and the light-receiving mechanism B being mounted on a board 529.

Electric connection within the respective housings 525, 527 is carried out by wire bonding or the like. A mirror 145 of a moving mirror for bar code reading apparatus (moving mirror) 143 is arranged so that it can swing about a swing center shaft 515. These light-emitting mechanism A, light-receiving mechanism B and moving mirror 143 are arranged within a frame, not shown, to form the bar code reading apparatus 141.

In the bar code reading apparatus 141, a light beam emitted from the light-emitting device 501 is reflected by the moving mirror 143 and the moving mirror 143 is caused to swing, thus scanning a bar code as an irradiation object. For the moving mirror 143 to swing, a magnetic material (magnet) 511 mounted on the mirror 145 is inserted into a driving coil 513 and then a positive/negative current is caused to flow through the driving coil 513 to attract or repulse the magnet 511. Thus, the mirror 145 is caused to swing about the swing center shaft 515 as its supporting shaft. In this manner, the light beam emitted from the light-emitting device 501 is deflected by the mirror 145 to scan the bar code, and a return light beam from the bar code is reflected to be incident on the light-receiving device 519.

On a back side 153 of the mirror 145, a swing member (bearing) 147 for rotatably supporting the swing center shaft 515 is fixed. In short, the mirror 145 can swing about the swing center shaft 515 fixed on the frame, not shown, through the bearing 147. The bearing 147 is adhered to the back side 153 of the mirror 145 by using an adhesive 151 shown in FIG. 14. This adhesive 151 has predetermined elasticity after hardening. The predetermined elasticity has such elasticity (cushion property) that a shock of collision of the mirror 145 with peripheral members can be attenuated. The magnet 511 mounted on the back side 153 of the mirror 145 is also fixed by this adhesive 151.

The mirror 145 of the moving mirror 143 is made of a glass material and rectangularly shaped. At four corners on the back side 153, which is opposite to a reflection surface 155 of the mirror 145, the adhesive 151 is applied in a spherical shape to cover a corner part 157 shown in FIG. 15. While the edge surfaces of the mirror 145 are made of the glass material, the corner parts 157 at the four corners, which are particularly sharp and fragile, are protected by the adhesive 151. Therefore, even if the mirror 145 swings excessively because of a shock from a drop or the like and its corner parts 157 contact the peripheral members, the adhesive 151 absorbs the shock and damage of the corner parts 157 can be avoided.

In this embodiment, a protective stopper member 159 having a U-shaped cross section is provided near the mirror 145. The protective stopper member 159 functions in such a manner that when a shock or the like causes the mirror 145 to swing over a predetermined swing angle for scanning, the end surfaces 159*a*, 159*b* the protective stopper member 159 are abutted against the mirror 145 with the adhesive 151 provided between them and thus regulate excessive swing of the mirror 145. In this embodiment, the protective stopper member 159 is arranged to be abutted against the mirror 145 when the mirror 145 swing over the predetermined swing angle. However, the protective stopper member 159 may be used as regulating means for regulating the swing of the mirror 145 to the predetermined swing angle.

For manufacturing this moving mirror 143, the adhesive 151 is applied to fix the bearing 147 and the magnet 511 as swing members on the back side 153 of the mirror 145. In this case, the adhesive 151 may be applied to junction surfaces of the bearing 147 and the magnet 511. At this adhesive application step, the same adhesive 151 is applied in a spherical shape to the corner parts 157 at the four corners on the back side 153 of the mirror 145. After that, the bearing 147 and the magnet 511 are fixed. Preferably, the application of the adhesive 151 to the corner parts 157 is carried out before the application of the adhesive 151 to the swing member adhering part. Thus, the adhesive 151 applied to the corner parts 157 can be left for hardening for a longer time, while the swing member can be adhered to the adhesive 151 immediately after the application.

In the moving mirror 143 constituted as described above, as the adhesive 151 is applied to cover the corner parts 157 at the four corners on the back side 153 of the mirror 145, damage of the mirror 145 due to contact with the other components can be prevented without using any dedicated buffer member such as a cushion sheet. Thus, miniaturization can be realized while the shock resistance can be improved. Moreover, since the adhesive 151 can be locally applied for protection, only a minimum necessary quantity of the adhesive 151 is required as a buffer member and the bar code reading apparatus 141 can be reduced in weight as a whole. Furthermore, since no dedicated buffer member is necessary and the conventionally used adhesive 151 is used, the manufacturing cost can be reduced.

The mirror 145 is abutted against the protective stopper member 159 through the adhesive 151 applied to the corner parts 157 at the four corners on the back side 153 of the mirror 145, and the adhesive 151 can absorb a shock, for example, if the bar code reading apparatus 141 is dropped. Thus, unlike the conventional structure, a dedicated buffer member such as a cushion sheet need not be bonded to the protective stopper member and the protective stopper member 159 can be made compact as a whole. As the protective stopper member 159 is a very small member which is approximately several mm, it is difficult to bond any buffer member to it. Therefore, the elimination of the buffer member bonding work largely contributes to improvement in the assembly work performance.

According to the manufacturing method for the moving mirror 143, the adhesive 151 can be applied within the work range of the conventional adhesive application step. Thus, it is possible to manufacture the moving mirror 143 in which the protective adhesive 151 is applied quite easily without adding any new step and without using any separate buffer member.

Other examples of the moving mirror for a bar code reading apparatus according to the present invention will now be described.

FIGS. 16A to 16D are back perspective views showing other examples of the moving mirror for bar code reading apparatus according to the present invention. FIG. 17 is a cross-sectional view showing another example of the adhesive application structure.

Figure 16A:
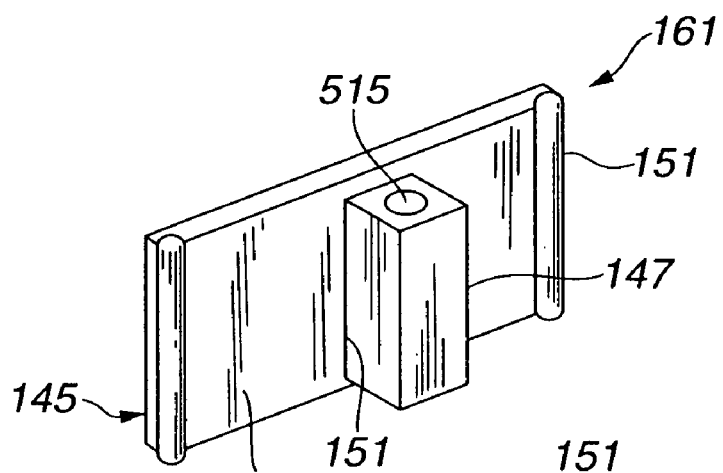
FIGS. 16A to 16D are perspective views showing back sides of other examples of the moving mirror for a bar code reading apparatus according to the present invention.
Figure 17:
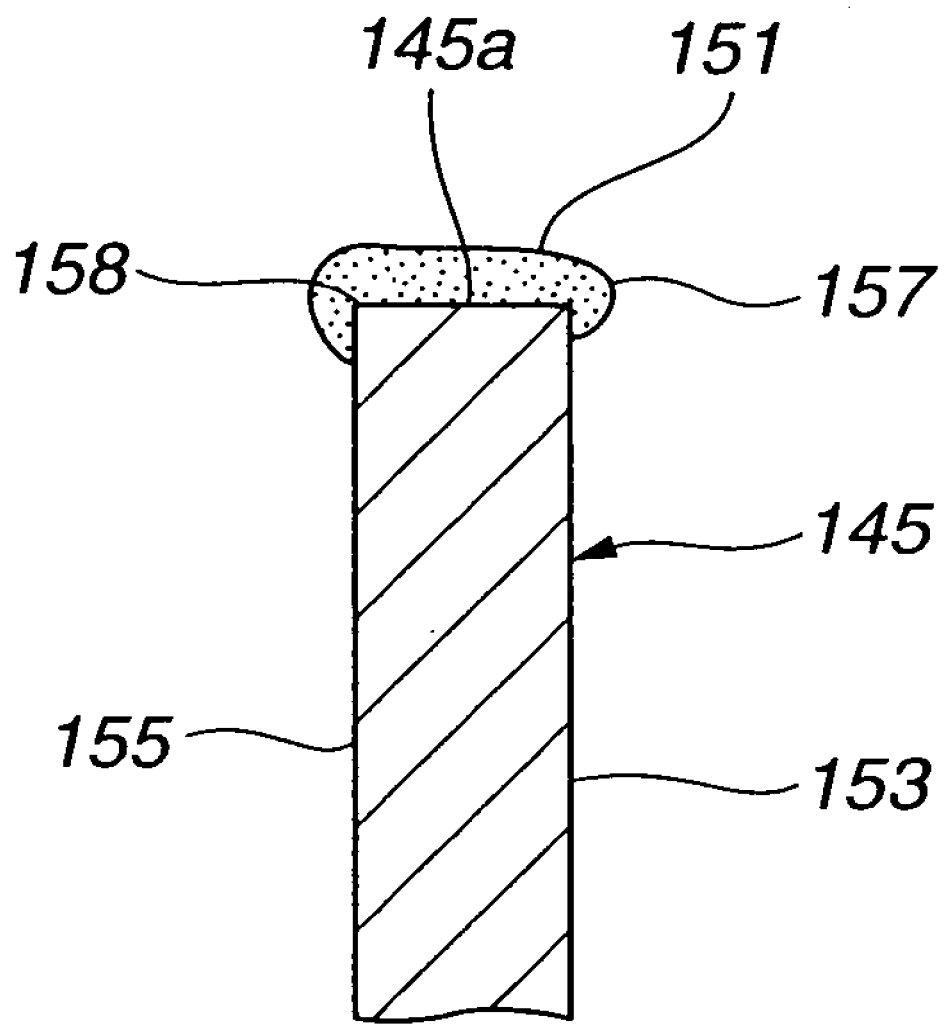
FIG. 17 is a cross-sectional view showing another exemplary adhesive application structure.

In a moving mirror 161 shown in FIG. 16A, the adhesive 151 is applied to cover a pair of edge parts parallel to the swing center shaft 515 on the back side 153. In this moving mirror 161, the edge parts at both ends of swing are covered with the adhesive 151 and the edge parts, which are fragile and have a large quantity of displacement due to swing, can be protected. Thus, the shock resistance can be improved.

Figure 16B:
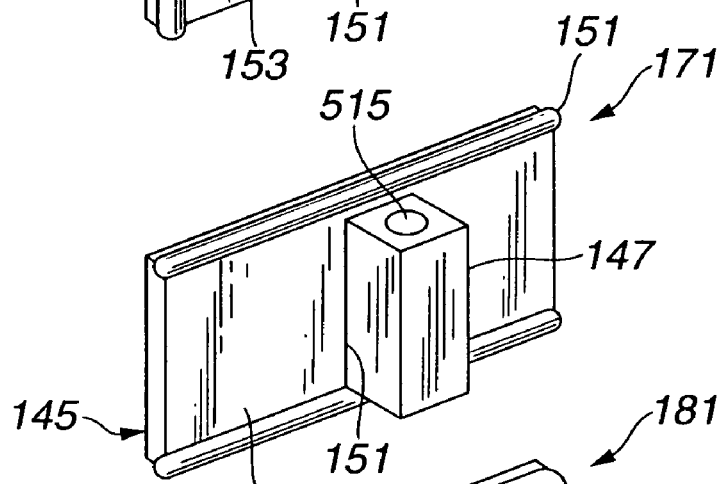

In a moving mirror 171 shown in FIG. 16B, the adhesive 151 is applied to cover a pair of edge parts orthogonal to the swing center shaft 515 on the back side 153. In this moving mirror 171, the edge parts equivalent to arm parts between both ends of the swing and the swing center shaft 515 are covered with the adhesive 151 and damage of the edge parts due to contact with the peripheral members can be prevented. Thus, the mirror strength and the shock resistance are improved.

Figure 16C:
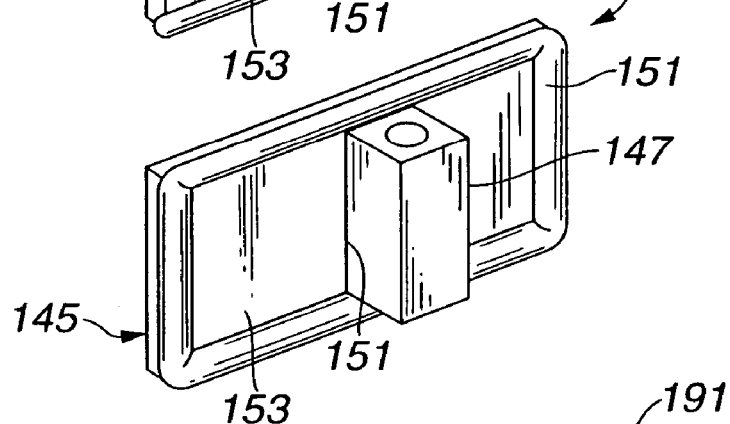

In a moving mirror 181 shown in FIG. 16C, the adhesive 151 is applied to cover edge parts on the entire circumferential edge on the back side 153. In this moving mirror 181, the edge parts on the entire circumferential edge on the back side 153 of the mirror 145 are covered with the adhesive 151. That is, as all the edge parts on the back side 153 are covered, damage of the edge parts due to contact with the peripheral members can be prevented and the adhesive 151 is integrated in a frame-like shape. Thus, the mirror strength and the shock resistance are improved further.

Figure 16D:
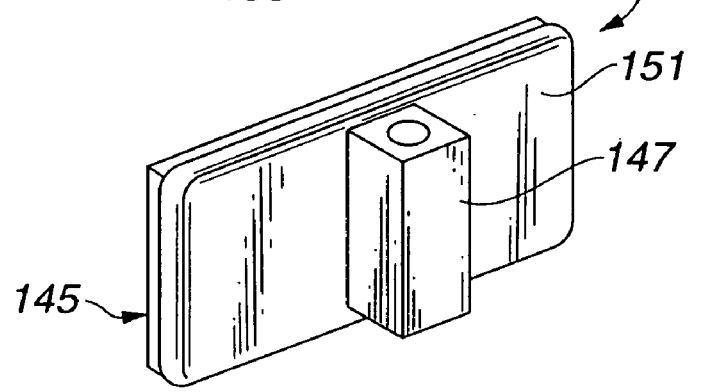

In a moving mirror 191 shown in FIG. 16D, the adhesive 151 is applied to the entire surface of the back side 153. In this moving mirror 191, damage due to contact with the peripheral members can be prevented on the entire back side 153 of the mirror 145 and the adhesive 151 is integrated in a planar shape. Thus, the mirror strength and the shock resistance are improved further. Moreover, since the entire surface is covered, it is also possible to prevent damage due to collision with the peripheral members broken and scattered by a shock. Furthermore, since the adhesive 151 is applied on the entire back side 153, the bearing 147 and the magnet 511 can also be adhered by using the adhesive 151, and the application of the adhesive for mirror protection and the application of the adhesive for fixing the swing member can be completed at one time.

In the above-described embodiment and respective examples, the adhesive 151 is applied to cover the corner parts 157 or the edge parts on the back side 153. However, the adhesive 151 may also be applied to cover corner parts 158 on the reflection surface 155, as shown in FIG. 17. In this case, though the effective area of the mirror 145 is decreased, an end surface 145a of the mirror 145 as well as the corner parts 157 on the back side 153 and the corner parts 158 on the reflection surface 155 can be covered. As all the edge parts are covered, the shock resistance of the mirror 145 can be significantly improved.

A bar code reading apparatus according to a third embodiment of the present invention will now be described in detail with reference to the drawings.

Figure 18:
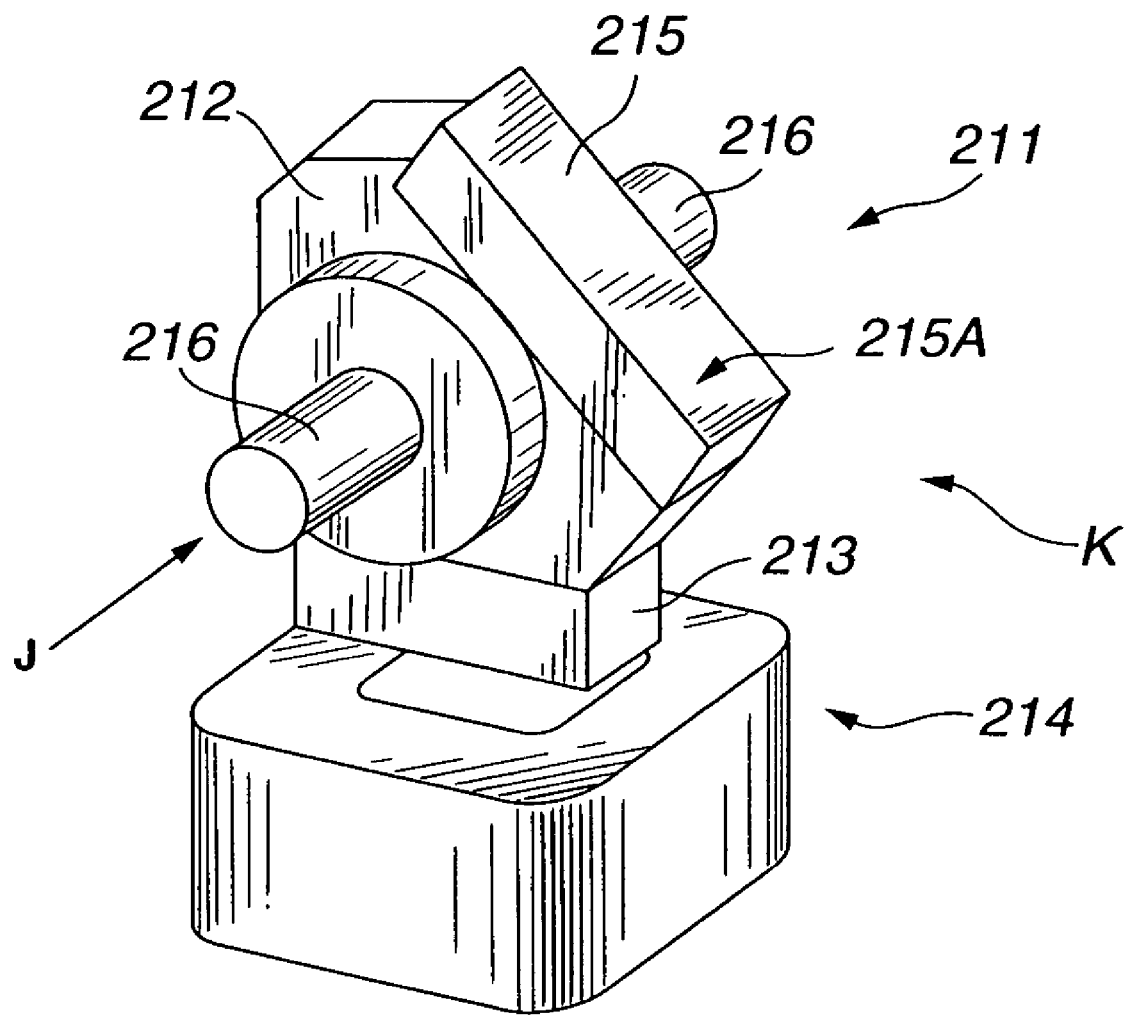
FIG. 18 is a perspective view showing the structure of a moving mirror applied to a bar code reading apparatus according to a third embodiment of the present invention.
Figure 19:
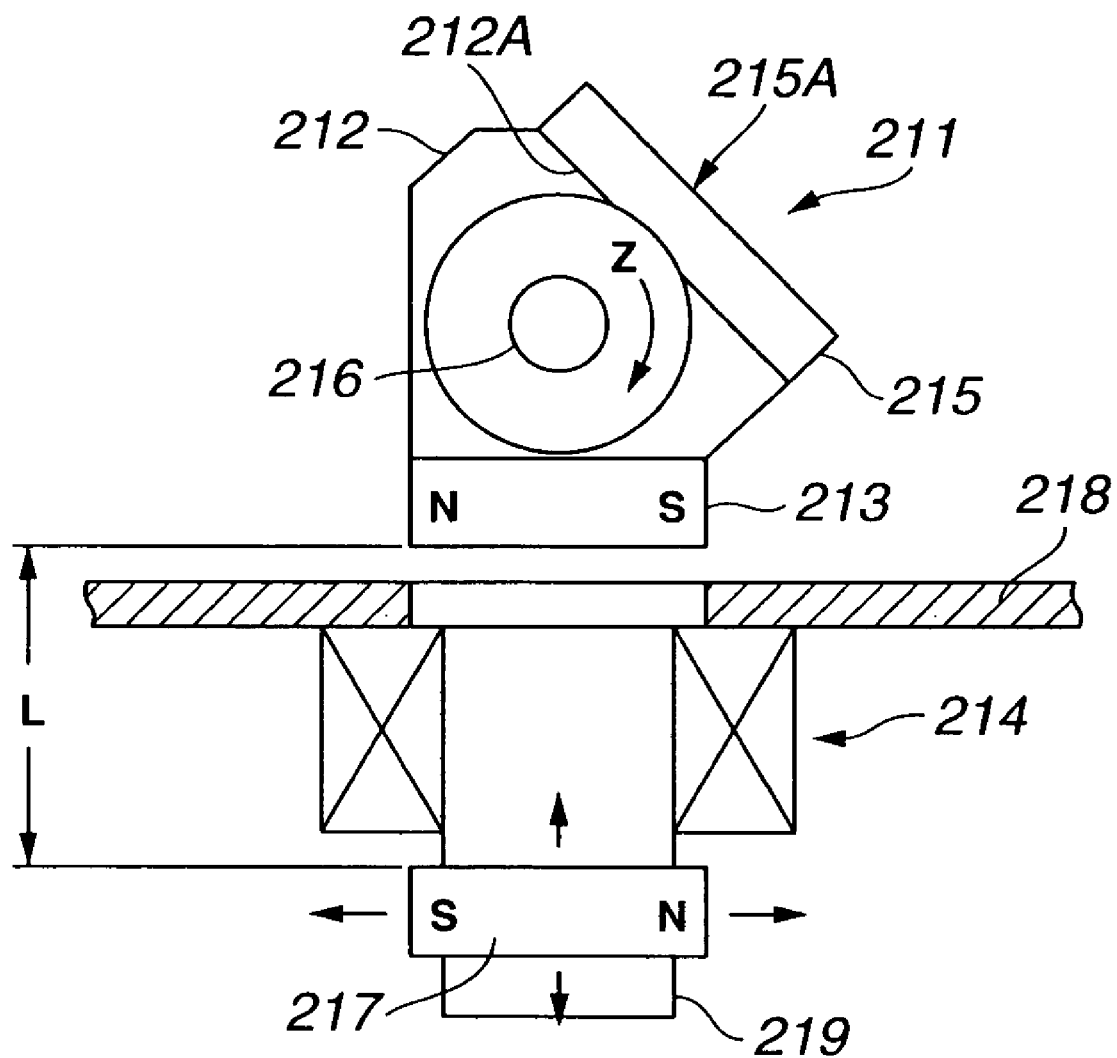
FIG. 19 is a partly broken side view showing the moving mirror of FIG. 18, as viewed from a direction of an arrow J.
Figure 20:
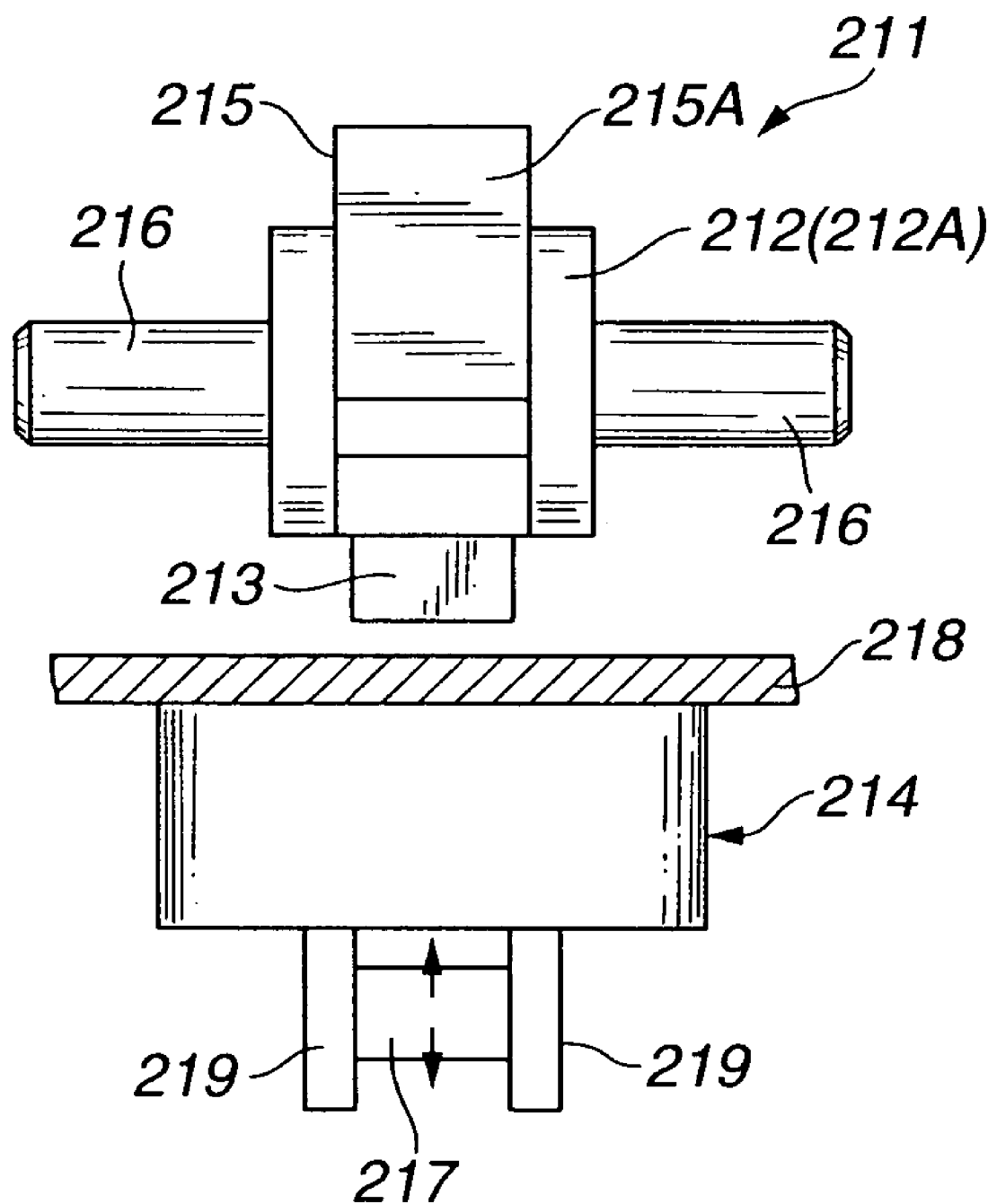
FIG. 20 is a front view showing the moving mirror of FIG. 18, as viewed from a direction K.
Figure 21:
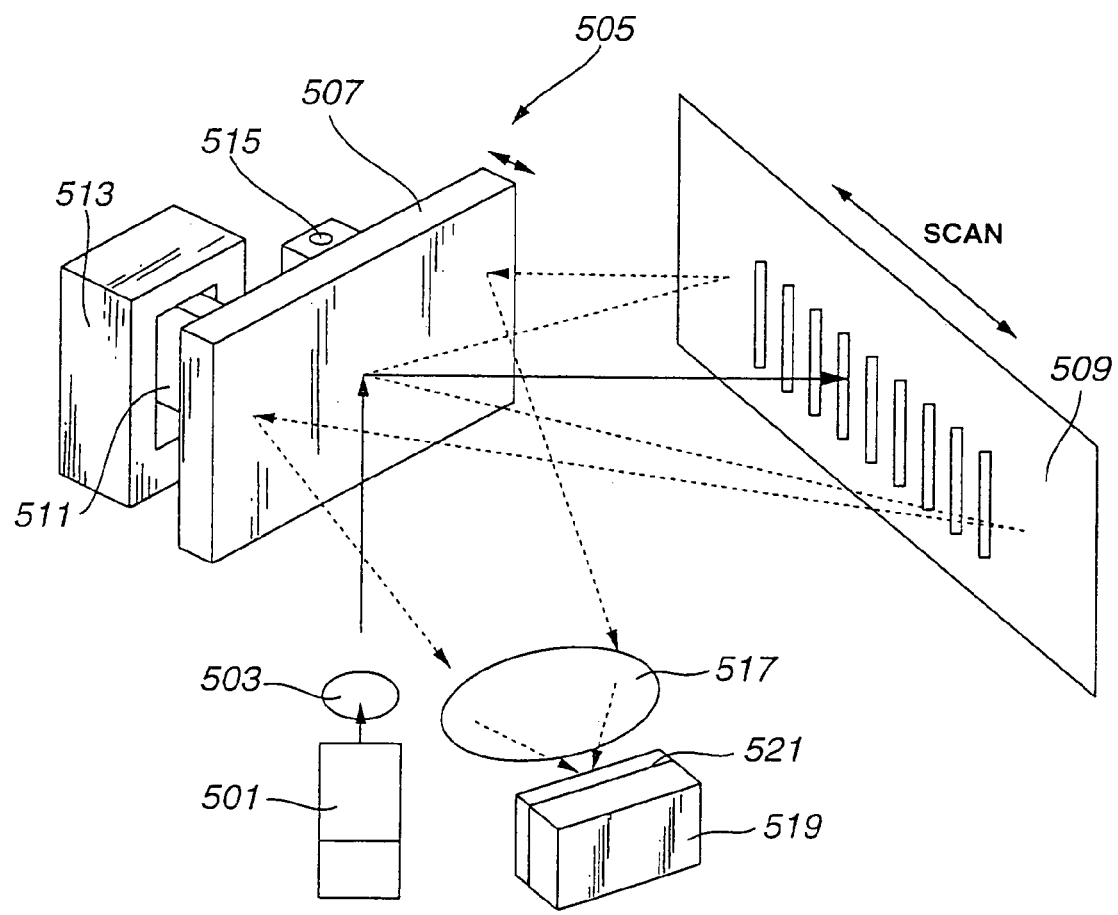
FIG. 21 is a conceptual view for explaining a conventional optical reading system.
Figure 22:
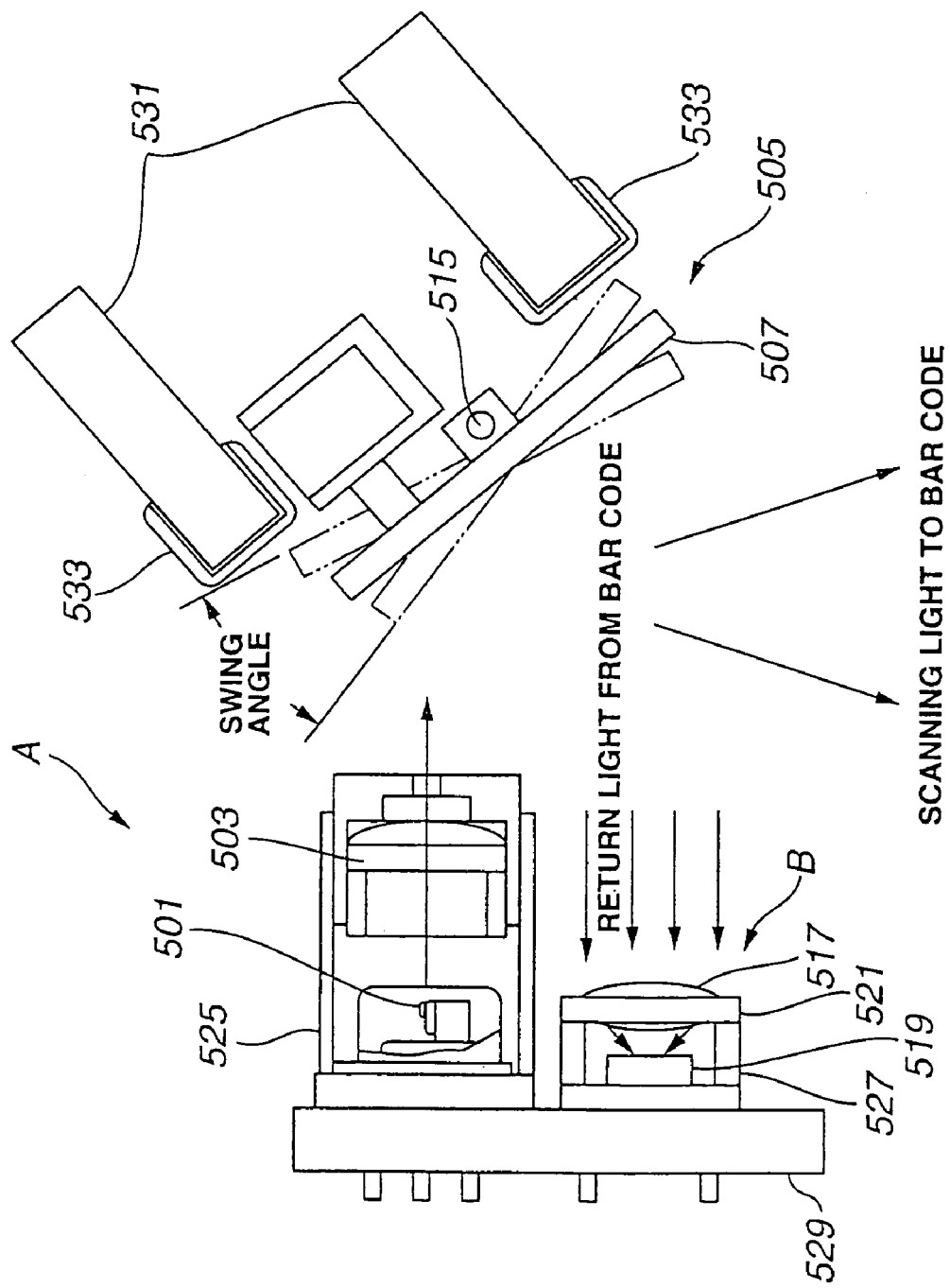
FIG. 22 is a cross-sectional view showing a conventional bar code reading apparatus.

FIG. 18 is a perspective view showing the structure of a moving mirror applied to a bar code reading apparatus according to the third embodiment of the present invention. FIG. 19 is a side view showing a partly broken cross section of the moving mirror of FIG. 18, as viewed from the direction of an arrow J. FIG. 20 is a front view showing the moving mirror of FIG. 18, as viewed from the direction of arrow K.

Generally, a moving mirror 211 shown in FIGS. 18 to 20 has a swing member 212, a first magnet 213, a driving coil 214, a mirror 215, and a second magnet 217. The swing member 212 is formed in a substantially triangular shape (right triangle), as viewed from its lateral side. The mirror 215, which has a flat plate-like shape, is integrally held on the swing member 212. The mirror 215 is mounted in a fixed state on an inclined surface 212A (see FIG. 19), for example, by using an adhesive. The mirror 215 has a reflection surface 215A for reflecting a light beam (laser beam or the like) emitted from a light-emitting device, not shown, toward a bar code. By changing the inclination angle of the reflection surface 215A in accordance with the swing operation of the swing member 212, the light beam reflected by the reflection surface 215A is caused to scan the bar code in the direction of its array.

On both sides of the swing member 212, swing shafts 216 are provided to protrude coaxially on the outer side of the swing member 212. As the swing shaft 216 on both sides of the swing member 212 are supported by a bearing part (not shown) of a housing 218, the swing member 212 is supported so that it can swing about the swing shafts 216. The housing 218, which is a case for housing the moving mirror 211, is formed by integrally molding a resin, for example. The swing shafts 216 may be integrally formed with the swing member 212 when integrally molding the resin to form the swing member 212, or may be incorporated in the swing member 212 by pressurization or the like. The former is preferred in order to reduce the number of components.

Moreover, on a lower surface (forming an acute angle with the inclined surface 212A) of the swing member 212, the first magnet 213 is mounted (fixed), for example, by using an adhesive. The first magnet 213 is a permanent magnet produced by magnetizing a ferromagnetic material and is formed in a stick-like shape with a rectangular cross section. The first magnet 213 has such a magnet structure that one end is the north pole and its other end is the south pole while an intermediate part in the longitudinal direction (axial direction) is a boundary part of magnetization polarity. When mounting the first magnet 213 on the bottom side of the swing member 212, the direction of mounting the first magnet 213 is set to be substantially orthogonal to the swing shafts 216, and accordingly, the direction of a magnetic field formed by the first magnet 213 also is set to be substantially orthogonal to the swing shafts 216. The boundary part of magnetization polarity of the first magnet 213 passes through the center (axial core) of the swing shafts 216 and is situated on a virtual line substantially at right angles to the surface on which the first magnet 213 is mounted (that is, a virtual line perpendicularly down from the center of the swing shaft 216 to the bottom of the swing member 212).

The driving coil 214, which corresponds to the swing driving unit of the present invention, is arranged to face the first magnet 213 with a gap between the driving coil 214 and the first magnet 213. The driving coil 214 is formed by winding a coil wire and functions to cause the swing member 212 to swing by magnetic attraction/repulsion with the magnetic field formed by the first magnet 213 in the gap part (that is, swing driving function). As a positive/negative (alternate) current is caused to flow through the driving coil 214, a driving magnetic field corresponding to the direction of the current is generated to pass through the center of the coil winding. The direction of this driving magnetic field is set as a direction (up-and-down direction in FIG. 19) substantially orthogonal to the direction (left-and-right direction in FIG. 19) of the magnetic field formed by the first magnet 213 and as a direction (up-and-down direction in FIG. 20) substantially orthogonal to the direction (left-and-right direction in FIG. 20) of the central axis of the swing shafts 216.

Similarly to the first magnet 213, the second magnet 217 is a permanent magnet produced by magnetizing a ferromagnetic material and is formed in a stick-like shape with a rectangular cross section. The second magnet 217 is arranged to face the first magnet 213 with the driving coil 214 provided between them. Similarly to the first magnet 213, the direction of mounting the second magnet 217 is set to be substantially orthogonal to the swing shafts 216, and accordingly, the direction of a magnetic field formed by the second magnet 217 is also set to be substantially orthogonal to the swing shafts 216. In an initial setting state, a boundary part of magnetization polarity of the second magnet 217 passes through the center (axial core) of the swing shaft 216 and is situated on a virtual line at substantially right angles to the surface on which the first magnet 213 is formed (that is, a virtual line perpendicularly down from the center of the swing shaft 216 to the bottom of the swing member 212), similarly to the first magnet 213. However, the magnetic poles (north and south poles) of the second magnet 217 are arranged in the opposite direction to the magnetic poles (north and south poles) of the first magnet 213. Thus, at the parts of the first magnet 213 and the second magnet 217 facing each other, a force of magnetic attraction acts between the opposite magnetic poles.

The second magnet 217 is supported between a pair of guide parts 219 that is integrally formed with the housing 218. The pair of guide parts 219 protrude outward through an air-core part of the driving coil 214 and their protruding parts support the second magnet 217 by sandwiching the second magnet 217. In this supporting state, the second magnet 217 is displaceable in a direction toward/away from the first magnet 213 (up-and-down direction in FIGS. 19 and 20) and in the direction of the central axis of the magnetic field of the first magnet 213 (left-and-right direction in FIG. 19). The displacement of the second magnet 217 is guided by the pair of guide parts 219 supporting the second magnet 217. In the displacement in each direction, fine adjustment of the position of the second magnet 217 is carried out by using a position adjustment jig or the like, not shown.

The operation of the moving mirror 211 constituted as described above will now be described. First, the static posture of the moving mirror 211 mounted on the swing member 212 is held by a force of magnetic attraction acting between the first magnet 213 and the second magnet 217. In this state, as a positive/negative current is caused to flow through the driving coil 214 in a predetermined cycle, a driving magnetic field corresponding to the direction of the current is generated in the direction of the central axis of the driving coil 214. In this case, if an upward driving magnetic field is generated in the driving coil 214 in FIG. 19, this driving magnetic field causes a force of magnetic repulsion to act on the north pole of the first magnet 213 and causes a force of magnetic attraction to act on the south pole of the first magnet 213. This magnetic attraction or repulsion generates a moment Z in the swing member 212 so as to rotate about the swing shafts 216. When the direction of the driving magnetic field is inverted by the inversion of the positive/negative current flowing through the driving coil 24, a moment to rotate the swing member 212 in the opposite direction is generated. Thus, the swing member 212 swings together with the mirror 215 held by the swing member 212, in accordance with the frequency of the current (alternate current) flowing through the driving coil 214.

In the moving mirror 211, which operates as described above, if the second magnet 217 is displaced in the up-and-down direction in FIG. 19 (equivalent to the first direction) when the driving coil 214 is not electrified (that is, in a non-driving state), a distance L between the first magnet 213 and the second magnet 217 changes accordingly. Therefore, the magnitude of the force of magnetic attraction acting between the first and second magnets 213, 217 also changes, Specifically, if the second magnet 217 is displaced upward in FIG. 19, the distance L between the first and second magnets 213, 217 becomes shorter and the force of magnetic attraction acting between the first and second magnets 213, 217 increases accordingly. On the other hand, if the second magnet 217 is displaced downward in FIG. 19, the distance L between the first and second magnets 213, 217 becomes longer and the force of magnetic attraction acting between the first and second magnets 213, 217 decreases accordingly.

In this manner, the force of magnetic attraction acting between the first and second magnets 213, 217 functions elastically like a spring to the swing member 212 when the swing member 212 is caused to swing by electrifying the driving coil 214. Therefore, by displacing the second magnet 217 in the up-and-down direction in FIG. 19 and thus changing the magnitude of the force of magnetic attraction acting between the first and second magnets 213, 217, the resonance frequency of the swing mechanism including the mirror 215 and the swing member 212 can be changed. As a result, the resonance frequency of the swing mechanism can be adjusted arbitrarily during the step of manufacturing the apparatus.

Meanwhile, if the second magnet 217 is displaced in the left-and-right direction in FIG. 19 (equivalent to the second direction) when the driving coil 214 it not electrified (that is, in a non-driving state), the positions of the magnetic poles of the first magnet 213 and the second magnet 217 relatively change. Therefore, the balance of the force of magnetic attraction acting between the first and second magnets 213, 217 changes, too. Specifically, if the second magnet 217 is displaced rightward in FIG. 19, the positions of the magnetic poles of the second magnet 217 shift rightward relative to the positions of the magnetic poles of the first magnet 213. Therefore, a resultant change in the balance of the force of magnetic attraction causes the swing member 212 to swing clockwise. On the other hand, if the second magnet 217 is displaced leftward in FIG. 19, the positions of the magnetic poles of the second magnet 217 shift leftward relative to the positions of the magnetic poles of the first magnet 213. Therefore, a resultant change in the balance of the force of magnetic attraction causes the swing member 212 to swing counterclockwise.

In this manner, the force of magnetic attraction acting between the first and second magnets 213, 217 functions as a force for holding the static posture (inclination) of the mirror 215 when the driving coil 214 is not electrified. Therefore, by shifting the second magnet 217 in the left-and-right direction in FIG. 19 and thus changing the balance of the force of magnetic attraction acting between the first and second magnets 213, 217, the static posture of the mirror 215 can be changed. Thus, the static posture of the mirror 215 can be adjusted arbitrarily during the step of manufacturing the apparatus.

When the adjustment of the resonance frequency of the swing mechanism and the adjustment of the static posture of the mirror 215 based on the displacement of the second magnet 217 are completed, the second magnet 217 is fixed to the pair of guide parts 219 by using an adhesive or the like.

As seen from the above description, in the bar code reading apparatus according to the present embodiment, even when a desired resonance frequency cannot be obtained because of the difference in the dimension and weight of the components, the second magnet 217 is appropriately displaced in the first direction (up-and-down direction in FIG. 19) at the final stage of the assembly process, thus obtaining the desired resonance frequency. This makes it easier to handle the apparatus. Particularly, in order to cause the magnetic circuit for mirror swing to efficiently operate, it is preferred that the resonance frequency of the swing member and the driving frequency are made coincident with each other. Therefore, by adjusting the resonance frequency of the swing mechanism to meet the preferred condition, the magnetic circuit can be caused to operate efficiently. As this optimizes the resonance frequency, the operation efficiency of the magnetic circuit can be improved and the power consumption can be reduced. Moreover, in the case where the moving mirror 211 is assembled using the similar components, different resonance frequencies can be obtained by displacing the second magnet 217.

Furthermore, even when the relative positions of the mirror 215 and the swing shafts 216 and the mounting position of the first magnet 213 differ, by appropriately displacing the second magnet 217 in the second direction (left-and-right direction in FIG. 19) at the final stage of the assembly process, the mirror 215 can be made static in a desired posture when the driving coil 214 is in a non-driving state, and the swing of the swing member 212 from that static posture can be started.

In the above-described embodiment, the static posture of the mirror 215 is adjusted by displacing the second magnet 217 in the direction of the central axis of the magnetic field of the first magnet 213. However, this invention is not limited to this embodiment. Even when the second magnet 217 is supported to be rotatable about its own boundary part of magnetization polarity and the second magnet 217 is made displaceable in a rotational direction centering on the boundary part of magnetization polarity, the balance of the force of magnetic attraction acting between the first and second magnets 213, 217 can be changed by displacing the second magnet 217 in the rotational direction, thus adjusting the static posture of the mirror 215 similarly to the above-described embodiment.

INDUSTRIAL APPLICABILITY

As described above, according to the reading apparatus of the present invention, since the laser module and the moving mirror which are not arranged in casings are housed in the housing, a so-called double-armor structure is avoided. Moreover, as the laser module has the light-emitting device and the light-receiving device arranged in a substantially orthogonal state, the apparatus is miniaturized without having any interference of light emission and reception. Furthermore, as the supporting pole of the moving mirror is moved up and down, the resonance frequency of its swing can be changed. In any case, the reading apparatus of the present invention can be miniaturized without lowering the reading accuracy and the assembly adjustment can be easily carried out.

According to the moving mirror for a bar code reading apparatus of the present invention, since the adhesive having predetermined elasticity after hardening is applied to cover the corner parts at the four corners on the back side of the rectangular plate-shaped mirror, damage of the mirror due to contact with the other components can be prevented without using any dedicated buffer member such as a cushion sheet, and both miniaturization and improvement in the shock resistance can be achieved. Moreover, since the adhesive can be applied locally for protection, the bar code reading apparatus can be reduced in weight. Furthermore, as no dedicated buffer member is necessary and the conventionally-used adhesive can be used, the manufacturing cost can be reduced.

According to the method for manufacturing a moving mirror for a bar code reading apparatus of the present invention, at the adhesive application step to the mirror for fixing the swing member, the same adhesive is applied to the corner parts at the four corners on the back side of the mirror. Therefore, the adhesive can be applied within the range of the conventional adhesive application step, and the moving mirror for a bar code reading apparatus can be manufactured quite easily without adding any new step and without using any separate buffer member.

According to the bar code reading apparatus of the present invention, by displacing the second magnet in the first direction to change the magnitude of the force of magnetic attraction acting between the first and second magnets, the resonance frequency of the swing mechanism including the mirror and the swing member can be changed. Moreover, by displacing the second magnet in the second direction change the balance of the force of magnetic attraction acting between the first and second magnets, the static posture of the mirror can be changed when the swing driving unit is in a non-driving state. This enables arbitrary adjustment of the resonance frequency of the swing mechanism and the static posture of the mirror. As a result, even when there are some differences (in the dimension, weight and mounting position of components) in manufacture, the resonance frequency of the swing mechanism and the static posture of the mirror can be set under optimum conditions.

The invention is claimed is:

1. A bar code reading apparatus comprising:
a laser module having a light-emitting device and a light-receiving device arranged in a substantially orthogonal state;
a moving mirror having a mirror mounted on a stand, swing shafts provided on both sides of the stand, a magnet mounted on a lower side of the stand, a supporting pole arranged below the magnet, and an air-core driving coil in which the supporting pole is inserted; and
a light-emitting lens for condensing a light beam from the light-emitting device and reflecting the light beam to the mirror;
the laser module, the moving mirror and the light-emitting lens being housed in a housing, wherein in the laser module, the light-emitting device and the light-receiving device are mounted on a lateral surface and a top surface of a prism, respectively, so that the light-emitting device and the light-receiving device are arranged in a substantially orthogonal state, and the light-receiving device has a broader area than the top surface of the prism and protrudes toward the light-emitting device.

2. A bar code reading apparatus comprising:
a laser module having a light-emitting device and a light-receiving device arranged in a substantially orthogonal state;
a moving mirror having a mirror mounted on a stand, swing shafts provided on both sides of the stand, a magnet mounted on a lower side of the stand, a supporting pole arranged below the magnet, and an air-core driving coil in which the supporting pole is inserted; and
a light-emitting lens for condensing a light beam from the light-emitting device and reflecting the light beam to the mirror;
the laser module, the moving mirror and the light-emitting lens being housed in a housing, wherein in the moving mirror, a top part of the supporting pole is arranged to have a magnetic space to the magnet and its leg part is inserted in the air core of the driving coil.

3. A moving mirror for a bar code reading apparatus in which a mirror connected to a magnetic material is caused to swing using a magnetic force generated by applying a current to a driving coil, a light beam emitted from a light-emitting device is deflected by the mirror to scan an irradiation object, and a return light beam from the irradiation object is reflected to be incident on a light-receiving device,
wherein at least at four corners on a rectangular back side which is opposite to a reflection surface of the mirror, an adhesive having predetermined elasticity after hardening is applied to cover the corner parts, wherein a protective stopper member is provided near the mirror to which the adhesive is applied, and the mirror is abutted against the protective stopper member wih the adhesive provided between them, thus regulating excessive swing of the mirror due to shock.

4. The moving mirror for the bar code reading apparatus as claimed in claim 3, wherein the adhesive is applied to cover a pair of edge parts parallel to a swing center shaft on the back side.

5. The moving mirror for the bar code reading apparatus as claimed in claim 3, wherein the adhesive is applied to cover a pair of edge parts orthogonal to a swing center shaft on the back side.

6. The moving mirror for the bar code reading apparatus as claimed in claim 3, wherein the adhesive is applied to cover edge parts on the entire circumferential edge on the back side.

7. The moving mirror for the bar code reading apparatus as claimed in claim 3, wherein the adhesive is applied to the entire back side.

8. A bar code reading apparatus comprising:
a swing member holding a mirror and supported so that it can freely swing about a swing shaft;
a first magnet mounted on the swing member and forming a magnetic field in a direction substantially orthogonal to the swing shaft;
a swing driving unit for causing the swing member to swing by magnetic attraction or repulsion to the magnetic field formed by the first magnet; and
a second magnet causing a force of magnetic attraction to act between different magnetic poles of the second magnet and the first magnet and provided to be displaceable in a first direction for varying the magnitude of the force of magnetic attraction and in a second direction for varying the balance of the force of magnetic attraction.

9. The bar code reading apparatus as claimed in claim 8, wherein the second magnet is arranged to face the first magnet with the swing driving unit provided between them, and is provided to be displaceable in a direction toward/away from the first magnet and in a direction of a central axis of a magnetic field of the first magnet.

10. The bar code reading apparatus as claimed in claim 8, wherein the second magnet is arranged to face the first magnet with the swing driving unit provided between them, and is provided to be displaceable in a direction toward/away from the first magnet and in a rotational direction about a boundary part of magnetization polarity of the second magnet.

* * * * *